US011488114B2

(12) United States Patent
Ebner et al.

(10) Patent No.: US 11,488,114 B2
(45) Date of Patent: Nov. 1, 2022

(54) SHARED COLLABORATIVE ELECTRONIC EVENTS FOR CALENDAR SERVICES

(71) Applicant: SAP SE, Walldorf (DE)

(72) Inventors: Rachel Ebner, Ra'anana (IL); Vitaly Vainer, Kfar Saba (IL); Evgeny Himmelreich, Lapid (IL); Edna Tamir-Dahan, Even-Yehuda (IL)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/796,353

(22) Filed: Feb. 20, 2020

(65) Prior Publication Data

US 2021/0264377 A1    Aug. 26, 2021

(51) Int. Cl.

| | |
|---|---|
| *G06Q 10/10* | (2012.01) |
| *H04L 51/046* | (2022.01) |
| *H04L 51/10* | (2022.01) |
| *H04L 67/1095* | (2022.01) |
| *H04L 67/141* | (2022.01) |
| *H04L 9/40* | (2022.01) |
| *H04L 67/10* | (2022.01) |

(52) U.S. Cl.
CPC ..... *G06Q 10/1095* (2013.01); *G06Q 10/1093* (2013.01); *H04L 51/046* (2013.01); *H04L 51/10* (2013.01); *H04L 63/10* (2013.01); *H04L 67/10* (2013.01); *H04L 67/1095* (2013.01); *H04L 67/141* (2013.01)

(58) Field of Classification Search
None
See application file for complete search history.

(56) References Cited

U.S. PATENT DOCUMENTS

| | | |
|---|---|---|
| 7,620,856 B2 | 1/2009 | Kagan et al. |
| 7,873,942 B2 | 1/2011 | Shaburov et al. |
| 8,291,214 B2 | 10/2012 | Helfman et al. |
| 8,321,430 B2 | 11/2012 | Zvi et al. |
| 8,583,678 B2 | 11/2013 | Vainer et al. |
| 8,689,174 B2 | 4/2014 | Shaburov et al. |

(Continued)

OTHER PUBLICATIONS

U.S. Appl. No. 16/176,520, filed Oct. 31, 2018, Ebner et al.

(Continued)

*Primary Examiner* — Lance Leonard Barry
(74) *Attorney, Agent, or Firm* — Fish & Richardson P.C.

(57) ABSTRACT

Disclosed herein are computer-implemented methods, computer-implemented systems, and non-transitory, computer-readable media for use of shared collaborative electronic events. A connection to a user calendar service is established by a shared calendar service. At least two electronic calendar events are received from the user calendar service. A determination is made for each received event whether a shared meeting object corresponding to the event exists in a shared meeting object store. If NO, a shared meeting object is created in the shared meeting object store for the electronic calendar event, meeting participants are determined for the electronic calendar event, and access to the shared meeting object is provided to each determined meeting participant. Providing access to the shared meeting object includes enabling each participant to add shared content to the shared meeting object and view shared content added by other participants.

20 Claims, 15 Drawing Sheets

(56) References Cited

U.S. PATENT DOCUMENTS

| | | | |
|---|---|---|---|
| 8,751,558 B2 | 6/2014 | Bleier et al. | |
| 8,937,618 B2 | 1/2015 | Erez et al. | |
| 9,053,152 B2 | 6/2015 | Sherman et al. | |
| 9,070,109 B2 | 6/2015 | Sherman et al. | |
| 9,152,947 B2 | 10/2015 | Sherman et al. | |
| 9,164,990 B2 | 10/2015 | Vainer et al. | |
| 9,213,954 B2 | 12/2015 | Khalatov et al. | |
| 9,218,189 B2 | 12/2015 | Vainer et al. | |
| 9,245,245 B2 | 1/2016 | Sherman et al. | |
| 9,262,385 B2 | 2/2016 | Ebner | |
| 9,277,028 B2 | 3/2016 | Ebner et al. | |
| 9,384,287 B2 | 7/2016 | Talyansky et al. | |
| 9,436,649 B2 * | 9/2016 | Meunier | G06F 15/16 |
| 9,558,287 B2 | 1/2017 | Sherman et al. | |
| 9,600,849 B2 | 3/2017 | Ebner et al. | |
| 9,619,773 B2 | 4/2017 | Himmelreich et al. | |
| 9,652,367 B1 | 5/2017 | Vainer | |
| 9,854,396 B2 | 12/2017 | Himmelreich et al. | |
| 9,965,450 B2 | 5/2018 | Gavriel et al. | |
| 9,986,057 B2 | 5/2018 | Ebner et al. | |
| 10,033,656 B2 | 7/2018 | Kravchik et al. | |
| 10,503,821 B2 | 12/2019 | Brunswig et al. | |
| 2008/0163015 A1 | 7/2008 | Kagan et al. | |
| 2009/0248480 A1* | 10/2009 | Miksovsky | G06Q 10/109 |
| | | | 705/7.19 |
| 2011/0162074 A1 | 6/2011 | Helfman et al. | |
| 2012/0041922 A1 | 2/2012 | Vainer et al. | |
| 2012/0198378 A1* | 8/2012 | Gruen | G06Q 10/109 |
| | | | 715/772 |
| 2013/0086483 A1 | 4/2013 | Vainer et al. | |
| 2013/0086495 A1 | 4/2013 | Guzansky et al. | |
| 2013/0091132 A1 | 4/2013 | Khalatov et al. | |
| 2013/0091456 A1 | 4/2013 | Sherman et al. | |
| 2013/0132420 A1 | 5/2013 | Vainer et al. | |
| 2013/0139081 A1 | 5/2013 | Alon et al. | |
| 2013/0144957 A1 | 6/2013 | Sherman et al. | |
| 2013/0159926 A1 | 6/2013 | Vainer et al. | |
| 2014/0013000 A1 | 1/2014 | Vainer et al. | |
| 2014/0040177 A1 | 2/2014 | Sherman et al. | |
| 2014/0040178 A1 | 2/2014 | Sherman et al. | |
| 2014/0123020 A1 | 5/2014 | Bleier et al. | |
| 2014/0136531 A1 | 5/2014 | Aflalo et al. | |
| 2014/0136630 A1* | 5/2014 | Siegel | G06Q 10/107 |
| | | | 709/206 |
| 2014/0201277 A1* | 7/2014 | DeLuca | G06Q 10/109 |
| | | | 709/204 |
| 2014/0222914 A1 | 8/2014 | Ebner et al. | |
| 2014/0282024 A1 | 9/2014 | Ebner et al. | |
| 2015/0088897 A1 | 3/2015 | Sherman et al. | |
| 2015/0095767 A1 | 4/2015 | Ebner et al. | |
| 2015/0095840 A1 | 4/2015 | Soshin et al. | |
| 2015/0278831 A1 | 10/2015 | Gal et al. | |
| 2015/0341282 A1 | 11/2015 | Bar-on et al. | |
| 2016/0078388 A1 | 3/2016 | Himmelreich et al. | |
| 2016/0094610 A1 | 3/2016 | Himmelreich et al. | |
| 2016/0127497 A1 | 5/2016 | Himmelreich et al. | |
| 2016/0344649 A1 | 11/2016 | Kravchik et al. | |
| 2017/0083871 A1* | 3/2017 | Chang | G06F 16/93 |
| 2017/0116112 A1 | 4/2017 | Vainer | |
| 2017/0220460 A1 | 8/2017 | Vainer | |
| 2018/0039949 A1 | 2/2018 | Cohen-Zur et al. | |
| 2018/0089632 A1* | 3/2018 | Singh | G06F 16/27 |
| 2018/0173806 A1 | 6/2018 | Forstmann et al. | |
| 2018/0276302 A1 | 9/2018 | Talyansky et al. | |
| 2018/0276593 A1* | 9/2018 | Perret | G06F 16/9535 |
| 2019/0034805 A1 | 1/2019 | Cohen-Zur et al. | |
| 2020/0067931 A1* | 2/2020 | Espinosa | G06Q 20/223 |
| 2021/0264377 A1* | 8/2021 | Ebner | H04L 63/10 |

OTHER PUBLICATIONS

Kyber.Me [Online], "Task Management, Project Management and Calendar for Slack" available on or before Jul. 14, 2019 via Internet Archive : Wayback Machine URL<https://web.archive.org/web/20190714131910/https://kyber.me/> retrieved on Feb. 5, 2020, URL <https://kyber.me/>, 11 pages.

Skejul.com[Online], "Simplify the Future" available on or before Aug. 14. 2019 via Internet Archive : Wayback Machine URL <https://web.archive.org/web/20190814114008/http://skejul.com/> retrieved on Feb. 5, 2020, URL <http://skejul.com/>, 2 pages.

Railly.co [Online], "Collaborative Scheduling Done Right" available on or before Mar. 13, 2015 via Internet Archive : Wayback Machine URL <https://web.archive.org/web/20150313061409/https://rallly.co/>, retrieved on Feb. 5, 2020, URL <http://rallly.co>, 3 pages.

Developer.Google.com [Online], "Class CalandarEvent" available on or before Jun. 16, 2016 via Internet Archive : Wayback Machine URL <https://web.archive.org/web/20160616203913/https://developers.google.com/apps-script/reference/calendar/calendar-event>, retrieved on Feb. 5, 2020, URL <https://developers.google.com/apps-script/reference/calendar/calendar-event.html>. 13 pages.

Doc.Miscrosoft.com [Online], "Outlook Calendar API Overview" available on or before Jul. 14, 2019. via Internet Archive : Wayback Machine URL <https://web.archive.org/web/20190714120259/https://docs.microsoft.com/en-us/graph/outlook-calendar-concept-overview>, retrieved on Feb. 5, 2020. URL. <https://docs.microsoft.com/en-us/graph/outlook-calendar-concept-overview>, 6 pages.

* cited by examiner

US 11,488,114 B2

SHARED COLLABORATIVE ELECTRONIC EVENTS FOR CALENDAR SERVICES

BACKGROUND

Different calendar systems can communicate using a protocol. An example calendar protocol is iTIP (iCalendar Transport-independent Interoperability Protocol). A calendar protocol can support organizer and attendee roles for calendar users. An organizer user can create a meeting object and send the meeting object, or updates to a meeting object, to attendees. Attendees can receive meeting information using electronic mail, for example.

SUMMARY

The present disclosure describes shared collaborative electronic events.

In an implementation, a computer-implemented method includes receiving, at a shared calendar service, permission from a first user to access electronic calendar information for the first user from a user calendar service. A connection to the user calendar service is established, by the shared calendar service. At least one electronic calendar event for the first user, is received, using the connection, from the user calendar service. A determination is made, for each received electronic calendar event for the first user, whether a shared meeting object corresponding to the electronic calendar event exists in a shared meeting object store managed by the shared calendar service. In response to determining that no shared meeting object corresponding to a first electronic calendar event exists in the shared meeting object store, a first shared meeting object is created in the shared meeting object store for the first electronic calendar event. Meeting participants are determined for the first electronic calendar event. The determined meeting participants include the first user and at least one other user. Access to the first shared meeting object is provided to each determined meeting participant. Providing access to the first shared meeting object includes enabling each meeting participant to add shared content to the first shared meeting object and view shared content added by other meeting participants. In response to determining that a second shared meeting object corresponding to a second electronic calendar event exists in the shared meeting object store, the second shared meeting object is updated based on the second electronic calendar event.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, all meeting content for a meeting can be stored in a same repository rather than in separate documents. Second, all meeting participants can collaborate on shared meeting content for a meeting, as well as maintain their own private notes min the same place Third, all meeting participants can directly modify a meeting without having to request a change from a meeting owner. Fourth, relationship information regarding meeting co-participants can be presented to a user. Fifth, meeting topic history can be examined by a user. Sixth, use of shared meeting agendas can improve meeting efficiency.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

Figure 1:
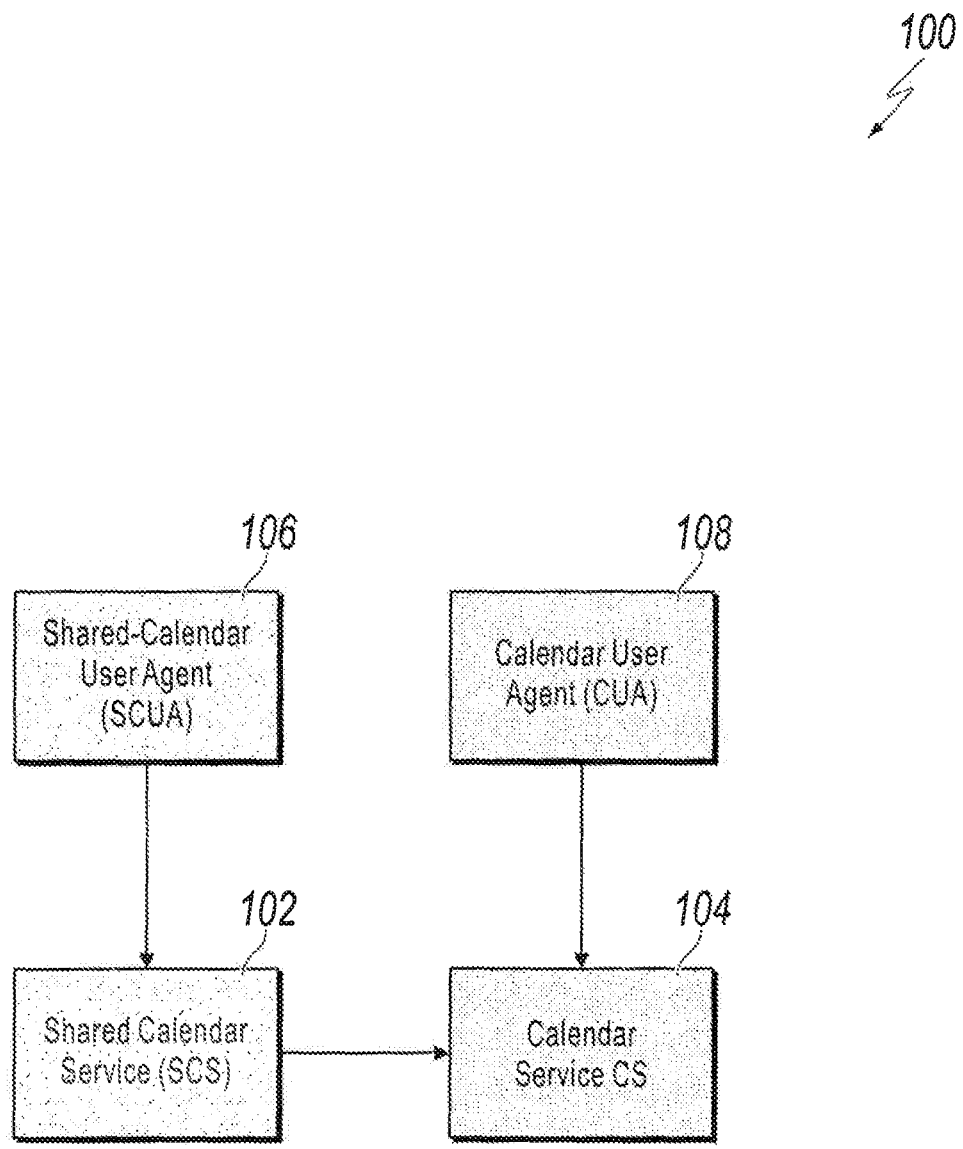
FIG. 1 is a block diagram illustrating an example of a shared calendar system, according to an implementation of the present disclosure.

The following detailed description describes shared collaborative electronic events, and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Existing calendar applications can have a one writer/many reader (or a one owner) paradigm for creating meetings. A meeting creator (owner) can create a meeting, with a date, time, participant list, and meeting content (such as topics), and send the created meeting to the meeting participants. Other meeting participants cannot edit the meeting content (such as date, time, or other content) using existing calendar applications. Rather, the meeting owner/creator can resend a meeting request after the meeting owner changes content, but other participants are not permitted to directly edit a shared meeting object. Instead, communication about new and changed meetings can be performed using electronic messages. Each person's calendar is essentially a private content area.

A one-owner paradigm can be inefficient, especially in environments where collaboration about meeting details is desired. For example, inefficiency and inconvenience can occur when a meeting owner is required to make repeated changes to a meeting, with each change requiring a resending of a meeting object to each participant. As a result, long conversation threads, with multiple messages, can occur when coordinating a single meeting.

Since exiting calendar applications prohibit meeting content to be collaboratively modified, some organizations use other, separate applications for storing and managing meeting content so that collaborative editing can be performed. As an example, meeting participants may use a notebook for meeting notes. Meeting content is then, disadvantageously, stored separately in multiple content sources (such as, separate computing data stores) or applications (for example, in both a calendar application and a collaborative document application, which may each have an separate associated computer data store). Preferably, having collaboratively editable meeting content in one application is desired. Group calendars, or other calendars which may allow multiple administrators, do not offer meeting-level granularity. Calendar Application Programming Interfaces (APIs) of other calendar systems may provide access to a calendar of a given user, but changes to the given user's calendar made through one or more APIs are generally not reflected in the calendars of other users.

To solve problems associated with the use of existing calendar systems, the present disclosure describes a shared calendar system which enables collaborative editing of meeting content, by any participant, in a meeting object. Instead of a one-writer, multiple-reader paradigm, the shared calendar system can enable any meeting participant to, for example, create or add notes, files, or other information to a meeting object; change the date or time of a meeting; or add/remove meeting participants. Shared meeting content, editable by all participants, can be shared in a meeting object itself, rather than in a content source separate from the meeting object. Accordingly, occurrences of misplaced meeting notes, as may occur when meeting notes are stored in separate applications, can be reduced. If a meeting is moved to another date or time, shared content for the meeting can remain attached to the meeting, after the meeting is moved.

The shared calendar system can also grant meeting-level (meeting-specific) modification privileges to participants, for each of multiple meeting objects. Meeting-level privileges can support a given participant being invited to a first meeting (and having full edit capability for the first meeting) and not being invited to (or permitted edit capability for) a second meeting.

Meeting efficiency can be improved through use of the described shared calendar system. For instance, meeting topics can be discussed by all participants in advance of a meeting, and adjusted as needed within a meeting object, thereby freeing up actual meeting time for discussion of agreed-upon topics. The shared calendar system can also be configured to send automatic reminders for participants to prepare for, and collaborate on, an upcoming meeting, such as to participate in establishing a shared meeting agenda. In-meeting activities can be improved due to a shared content space that includes all participants' shared notes associated with the meeting. Private, per-person notes can also be recorded, before, during, or after a meeting. The shared calendar system can support various post-meeting features, for further meeting efficiency improvement. For example, a shared calendar application can enable features to assign action items, perform goal setting, revisit topics, and generate/distribute meeting summaries.

FIG. 1 is a block diagram illustrating an example of a shared calendar system 100, according to an implementation of the present disclosure. In some implementations, the shared calendar system 100 can include a Shared Calendar Service (SCS) 102, which can be an extension to an existing calendar service (CS) 104. The SCS 102 can store content, per meeting, and allow collaboration by meeting participants on the stored meeting content. The shared calendar system 100 can also include a Shared Calendar User Agent (SCUA) 106, which can provide a user interface that integrates with the SCS 102 and allows meeting participants to make changes to the meeting shared storage. For example, users can use the SCUA 106 instead of a default calendar user agent 108.

The system 100 can be configured in different ways. For example, the SCS 102 can store meeting information (such as, start time, end time, and title) received from the CS 104, as well as shared meeting content that may have been added or edited by multiple meeting participants. The SCUA 106 can receive the meeting information, and the shared content, from the SCS 102, and present the received meeting information and shared content. As another example, the SCS 102 can be configured to store just shared meeting content (and not other meeting information such as start times, end times, and titles). The SCUA 106 can receive shared meeting content from the SCS 102, and meeting information from the CS 104, and present the received shared meeting content and the meeting information.

In some implementations, the SCS 102 is implemented as a calendar server extension, and can interface with the CS 104 using standard calendar protocol(s). In other implementations, the SCS 102 can be a standalone calendar server that does not interface with the CS 104 (which can be optional in such examples). However, to maintain compatibility with users' existing calendar applications and stored calendars, the SCS 102 may preferably be implemented to connect to the CS 104.

Figure 2:
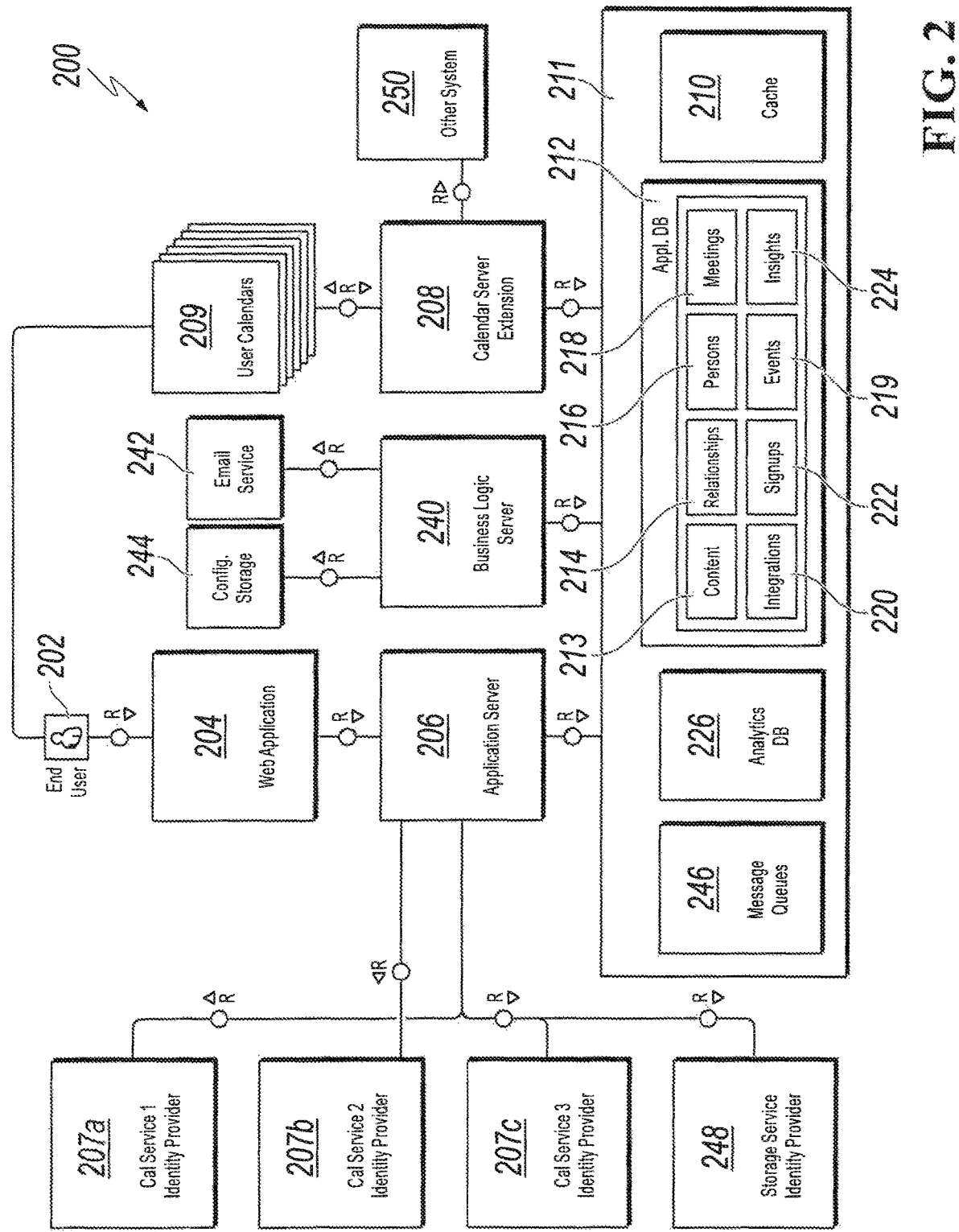
FIG. 2 is a block diagram illustrating an example of a shared calendar system, according to an implementation of the present disclosure.

FIG. 2 is a block diagram illustrating an example of a shared calendar system 200, according to an implementation of the present disclosure. An end user 202 can use a shared calendar application 204 (for example, a web application or other type of client application). The shared calendar application 204 can be provided by an application server 206. The shared calendar application 204 can be an example of the previously described SCUA 106. The application server 206 can authenticate and provide access to users of the shared calendar application 204. For example, the user 202 can log into the shared calendar application 204 using one of first 207*a*, second 207*b*, or third 207*c* calendar service identity provider, and can register with the shared calendar application 204. Registration can include the user 202 authorizing a calendar server extension 208 to connect to a user calendar 209 on behalf of the user 202. In some implementations, tokens for connecting the calendar server 208 extension to the user calendar 209 can be stored, such as in a cache 210 in a data storage layer 211.

The calendar server 208 extension and the application server 206 can use the data storage layer 211 for application data persistence and for analytical data. For example, the cache 210 can include cached user interface information, as well as cached tokens (or other cached information). As another example, the data storage layer 211 includes an application database 212 that can store shared (and private) meeting content 213 (for example, in a meeting store per identified meeting), relationship information 214, shared meeting application user (person) information 216, meeting information 218, and calendar event information 219 (for example, as received from user calendars 209). Although shown as a database used directly by the application server 206, in some implementations, application data can be stored for the shared calendar application 204 in an external, third-party database.

Person information 216 can include an entry for each identified person/user of the shared calendar system. Information can be stored for each user who logs into the system, each user who connects a user calendar to the system, or each meeting participant with which a user has a scheduled meeting. Users/people can be identified using an email address, for example. In some instances, certain email addresses or domains are ignored/excluded if an email address or domain is determined to be or be associated with a list, a bot, a meeting room, or some other non-person entity.

Relationship information 214 can be established for each determined relationship between two people/users of the system. A relationship can exist between each person who attends a meeting with another person. As another example, a relationship can be defined as being a link between a meeting owner and a meeting participant. Relationship types can be configured/identified, such as manager/employee, mentor/mentee, customer/account-manager, and others. In some implementations, other relationship attributes can be identified, such as relationship distance (for example, co-located or remote).

Other examples of stored information can include information for integrations 220, signups 222, and insights 224. In some implementations, the data storage layer 211 includes an analytics database 226. Integration information 220 can include tokens for connecting to other systems 250 on behalf of the user 220, obtained after approval of user 202 in accordance with standard connectivity and security flows such as OAuth and SAML (Security Assertion Markup Language).

Signup information 222 can be used to provide registration links to users who are invited to join the system, after users have been identified. Prospect users can be identified based on an email address being identified in a participant list of a meeting, for example. Data in the signup information 222 can expire after a predetermined period of time, if a user fails to accept an invitation to join the system.

Insights information 224 can include personality insights that can describe groups of people according to known personality models. Person information 216 may be associated with the insights information 224, such as if a user answered one or more personality questionnaires and accepted one or more personality insights determined by the system.

The calendar server 208 extension can connect to user calendars 209 (for example, after user approval is received). The calendar server 208 extension can receive information from the user calendars 209 through an established connection. In some instances, the calendar server 208 extension can pull information from the user calendars 209 and/or can be pushed information from the user calendars 209. For example, the calendar server 208 extension can register for and receive notifications from the user calendars 209 upon calendar object updates.

In some implementations, a business logic server 240 performs some of the operations for the shared calendar application 204. For instance, the business logic server 240 can process calendar information from at least one of the supported calendar services. For example, the business logic server 240 can process calendar-related email(s) (that may be received from a calendar service using an email service 242) and update the application database 212 using information from the calendar-related email(s). As another example, the business logic server 240 can process calendar events received from the calendar server 208 extension. In some instances, the business logic server 240, the application server 204, and the calendar server 208 extension can be portions of the previously SCS 102.

In some implementations, the business logic server 240, the application server 206, and the calendar server 230 can communicate using message queues 246. For example, the business logic server 240, the calendar server 208 extension, and the application server 206 can retrieve messages from one or more message queues 246. For instance, if a user connects or disconnects a user calendar 209 using the shared calendar application 204, the application server 206 can send a message to the calendar server 208 extension instructing the calendar server 208 extension to connect to, or disconnect from, the user calendar 209.

As another example, the calendar server 208 extension can receive a calendar event, from the user calendar 209. The calendar server 208 extension can, in some implementations, reformat the calendar event and send a reformatted calendar event to the business logic server 240 as a message (for example, to be stored in and retrieved from a message queue 246). The business logic server 240 can retrieve a message from the message queue 246, process the message, and update the application database 212 using information from the message. In some implementations, the business logic server 240 sends a message to the application server 206 upon a change to the application database 212. In some instances, the application server 206 can update the shared calendar application 204 (such as, to update a user interface with new or changed meeting information).

Other examples include the business logic server 240 (or another component) sending emails to users of the shared calendar application 204 using the email service 242. Users can receive various notifications, for instance. As another example, the business logic server 240 can store and manage certain configuration data for some parts of the system such as the web application 204, the application server 206, the business logic server 240 and/or the calendar server extension 208, such as by interfacing with a configuration storage service 244.

The system 200 can also include other components. For example, a storage service identity provider 248 can store and manage user accounts for a storage service used by the shared calendar application 204 on behalf of users. As another example, the calendar server 208 extension can interface with one or more other applications or systems 250, to present data from another application or system in the shared calendar application 204. For instance, the calendar server 208 extension can interface with a human resources goal management system, so that the shared calendar application 204 can include goal management as part of managing one-on-one meetings with managers and employees. Connectivity tokens for other systems can be stored in the cache 210. In some implementations, data from other systems is stored in the cache 210 and/or the application database 212.

In general, when an external system integrates with the shared calendar system, business object or other data representations can be created in the shared calendar system, when external data can be mapped to either one or more persons, a relationship, or a meeting. Relevant external data can be visible to a mapped user, or to the two members in a mapped relationship, or to all participants in a mapped meeting, for example. Updates to embedded external information can occur using periodic polling or push notifications. External data used in the shared calendar system can be data that specific users have appropriate permission to view.

Figure 3:
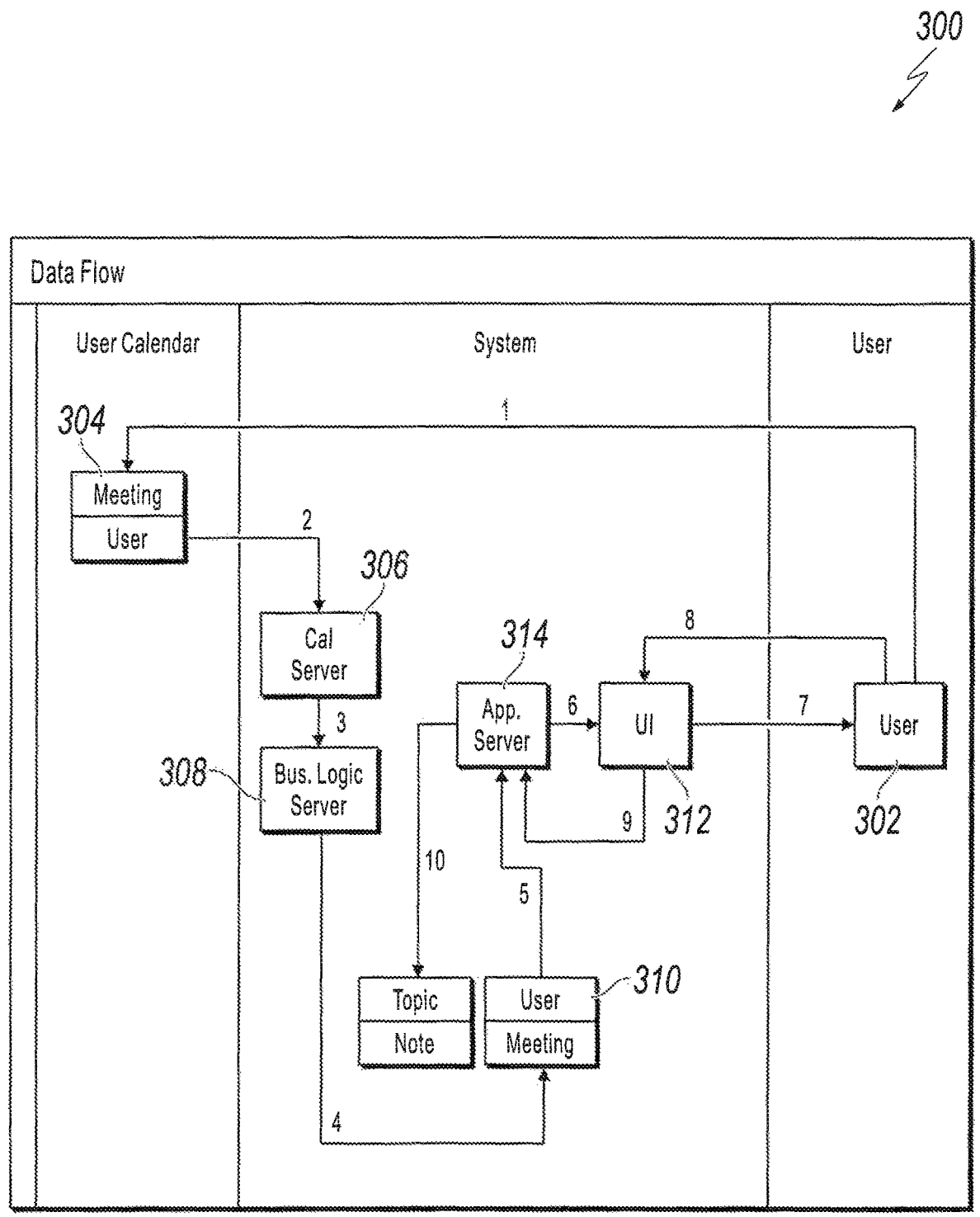
FIG. 3 is a data flow diagram illustrating an example of a shared calendar system, according to an implementation of the present disclosure.

FIG. 3 is a data flow diagram illustrating an example of a shared calendar system 300, according to an implementation of the present disclosure. The shared calendar system can include a shared calendar application that provides a user interface for meeting participants to view and track scheduled meetings. Meetings can include shared conversations and other shared content. Each conversation or shared content item can be viewed by participants of the meeting.

As a first step (denoted as a circled "one") in shared calendar content management, a first user 302 creates a meeting in a user calendar application (for example, the calendar user agent 108 or the shared calendar user agent 106) and invites other meeting participants. Meeting information for the created meeting can be stored for each participant in respective user calendars 304. For users who have granted access for the shared calendar application to respective user calendars, a calendar server 306 can read (or receive a notification about) meetings in respective user calendars 304, as illustrated in a second step.

The calendar server 306 can forward received meeting information to a business logic server 308, as illustrated by a third step. The business logic server 308 can process received meeting information and store processed meeting information in an application database 310, as illustrated by a fourth step.

The first user 302 and/or other user(s) can open a shared calendar application user interface 312. For example, the shared calendar application user interface 312 can be part of a client application, or can be or can be associated with code running in a user's browser. For each user who opens the shared calendar application user interface 312, an application server 314 can read meeting information for that user's meetings, from the application database 310 (as illustrated by a fifth step). The application server 314 can provide obtained meeting information for the user to the shared calendar application user interface 312 (in a sixth step), for presentation to the respective user (in a seventh step).

A user can provide shared content for a meeting using the shared calendar application user interface 312, as illustrated by an eighth step. For example, the user can create topics, add notes to topics, or provide other content, such as a document to share to meeting participants. The shared calendar application user interface 312 can provide added shared content to the application server 314 (in a ninth step), and the application server 314 can store the shared content, in association with the meeting, in a meeting store for the meeting, in the application database 310 (as illustrated by a tenth step).

Figure 4:
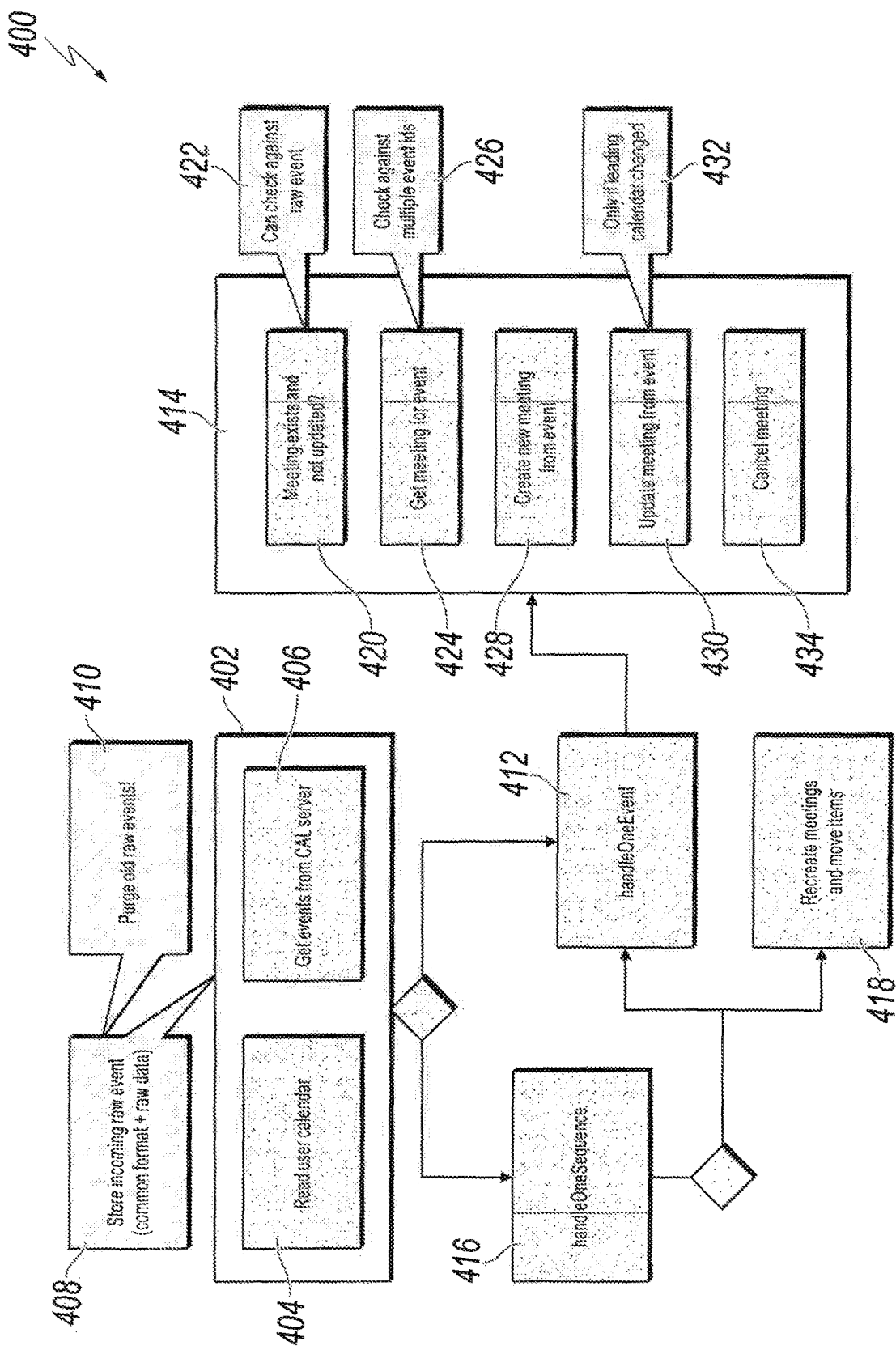
FIG. 4 is a flowchart illustrating an example of a computer-implemented method for managing meeting information in a shared calendar system, according to an implementation of the present disclosure.

FIG. 4 is a flowchart illustrating an example of a computer-implemented method 400 for managing meeting information in a shared calendar system, according to an implementation of the present disclosure.

At 402, calendar event information is received. For example, calendar event information can be read, at 404, from one or more user calendars. As another example, calendar event information can be received, at 406, from a calendar server. As indicated by a note 408, received calendar event information can be stored in a common format, for example in an event database.

As indicated by a note 410, in some implementations, old event and meeting information can be occasionally (or periodically) purged from the event database and/or a meeting database (and possibly archived in another data storage area). Purging/archiving old events and meeting information can improve performance. In some implementations, automatic purging/archiving is performed. For instance, a periodic process can automatically purge/archive events and meeting information that is more than one month old. Keeping event and meeting data stores with relatively current data can, as mentioned, improve performance and be consistent with a goal/purpose of a shared calendar application being an application primarily configured for handling current, recent, and upcoming meetings.

At 412, a given event included in the received event information is handled. An overview of possible types of event handling is described in the following discussion of processing block 414. Single event handling is also described in the following discussion of FIG. 5.

At 416, if the received event information includes or corresponds to a meeting sequence (series), each meeting in the sequence/series can be processed at step 412 by processing received event information separately for each meeting in the series. Processing a meeting sequence can also include, at 418, recreating meeting and moving items. Meeting sequence handling is also described in the following discussion of FIG. 6 and FIG. 7.

At 414, a single event is handled. Handling a single event can include, at 420, determining whether a meeting object corresponding to the event exists (in a meeting database) and is not updated. As indicated by a note 422, determining whether a meeting object exists can include comparing a meeting object to raw event information (as well as, or in addition to, comparing an event identifier in event information to an event identifier in a meeting database). As another example, determining whether a meeting object exists can include comparing information in a calendar event that describes a sequence of changes to existing recorded information (for example, information recorded in the data storage 211).

At 424, a meeting object for an event is retrieved (for example, if a meeting object has been located). As indicated by a note 426, a meeting object can be retrieved using different types of event identifiers (or identifying information).

At 428, a new meeting object is created from received event information (for example, if a meeting object has not been located).

At 430, an identified or created meeting object is updated based on the event information in the received event. As indicated by a note 432, in some implementations, a meeting object is updated only if the received event information is from a calendar of a leading user. A leading user can be a meeting organizer or another user (for example, if the meeting organizer has not connected to a shared calendar system).

At 434, a meeting is cancelled (for example, if received event information indicates a cancelling of a meeting).

Figure 5:
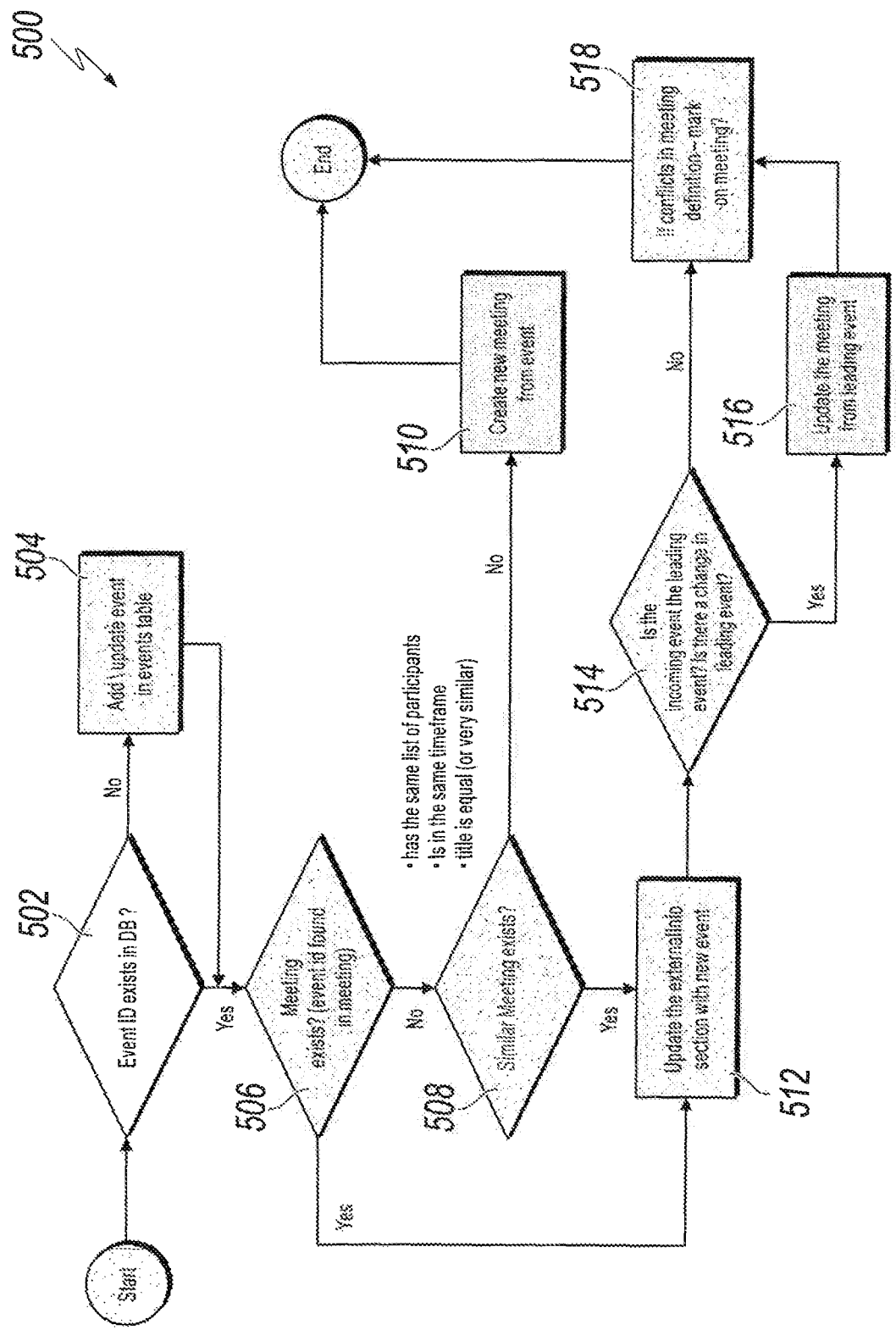
FIG. 5 is a flowchart illustrating an example of a computer-implemented method for processing event information for a single event, according to an implementation of the present disclosure.

FIG. 5 is a flowchart illustrating an example of a computer-implemented method 500 for processing event information for a single event, according to an implementation of the present disclosure.

At 502, a determination is made as to whether an event identifier included in received event information for an event is already included in an event database. The event database can be a cache of received event information, for example. In some instances, event information can be received from a user calendar.

At 504, in response to determining that the event identifier in the received event information is not in the event database, the event information is added to an events table in the event database.

At 506, in response to determining that the event identifier in the received event information is in the event database, or after a new event is added to the event database, a determination is made as to whether a meeting object corresponding to the event exists in a meeting database. A meeting object can be associated with a same event identifier as an event identifier in the event, for example. A meeting object may already exist in the meeting database due to a previous receiving of calendar event information for a same meeting, from another participant's calendar. The system can determine whether different sets of received event information, received from different users, correspond to a same meeting, in which each of the different users are participants.

In some implementations, some or all user calendar services can have different types of event identifiers. In some instances, one type of event identifier can be revealed (and included) in received event information. In other instances, a first type of event identifier is not revealed (or included) in received event information and a secondary event identifier is included, based on behavior of a calendar service API, for example. Accordingly, different checks for different types of event identifiers can be performed to determine whether a meeting object with a same event identifier as a received event exists in the meeting database.

At 508, in response to determining that a meeting object is associated with a same event identifier as in the received event information does not exist in the meeting database, a determination is made as to whether a similar meeting object exists in the meeting database. A similar meeting object can have a same timeframe (same start and end time), a same list of participants, and a same (or similar) title, for example, as corresponding information in the received event information. Accordingly, a set of heuristics can be used to determine whether a similar meeting object (similar to received event information) exists in the meeting database and has a likelihood more than a threshold of corresponding to a same meeting.

In existing calendar services, user meetings, on different calendars, can become unsynchronized. For example, a similar meeting object may exist due to one or more meeting participants not receiving (or accepting) an update previously sent by a meeting owner. As another example, a meeting participant can change a meeting title in their copy of a meeting and not sent an update to other meeting participants. Heuristic evaluation can determine that in fact, slightly different event information corresponds to a same meeting. In summary, different approaches can be used to identify that a meeting exists in the meeting database, including checking for and comparing different types of identifiers and heuristic evaluation on non-identifier fields.

In some implementations, if a determination indicate a possible but inconclusive match between event information and existing meeting objects, event information can be flagged as needing to be resolved. Flagged event information can be resolved through administrator evaluation, or from prompting users (for example, meeting participants) to confirm whether an event on their user calendar matches an event in the meeting database of the shared calendar system.

At 510, in response to determining that a similar meeting object does not exist in the meeting database, a new meeting object is created in the meeting database using the received event information. The new meeting object can be used for storing (or linking to) shared meeting content added by users of a shared calendar system, for example. After 510, method 500 can stop.

At 512, in response to determining that a meeting object with a same event identifier as in the received event information exists in the meeting database, event information for the meeting object is updated based on the received event information. A meeting object can include (or can link to) corresponding event information, for example.

At 514, a determination is made as to whether the received event information is from a leading calendar and includes changed event information. In some implementations, meeting changes are applied if the changes come from the calendar that has been identified as a leading calendar. A meeting organizer's calendar can be flagged as a leading calendar, for example. If the meeting organizer has not connected to the shared calendar system, a participant other than the meeting organizer can be flagged as having the leading calendar. A leading calendar can be used so that information from one calendar (for example, a meeting start time, end time, and title), among the calendars of all the meeting participants, is used as a reference point or source of truth for the meeting.

At 516, in response to determining that the received information is from a leading calendar and includes changed event information, the meeting object is updated based on the changed event information.

At 518, in response to determining that there are conflicts in received event information for the meeting, the meeting can be flagged as having potential conflicts. Conflicts can occur, for example, if event information received from a non-leading calendar does not match event information received from a leading calendar. In some implementations, updates are made only from the leading calendar, but other differences can be flagged and presented to users for confirmation/resolution, for example. In other cases, all information from all the different user calendars can be displayed and users can choose to synchronize their own user calendars with the meeting information provided by the leading calendar. After 518, method 500 can stop.

Figure 6:
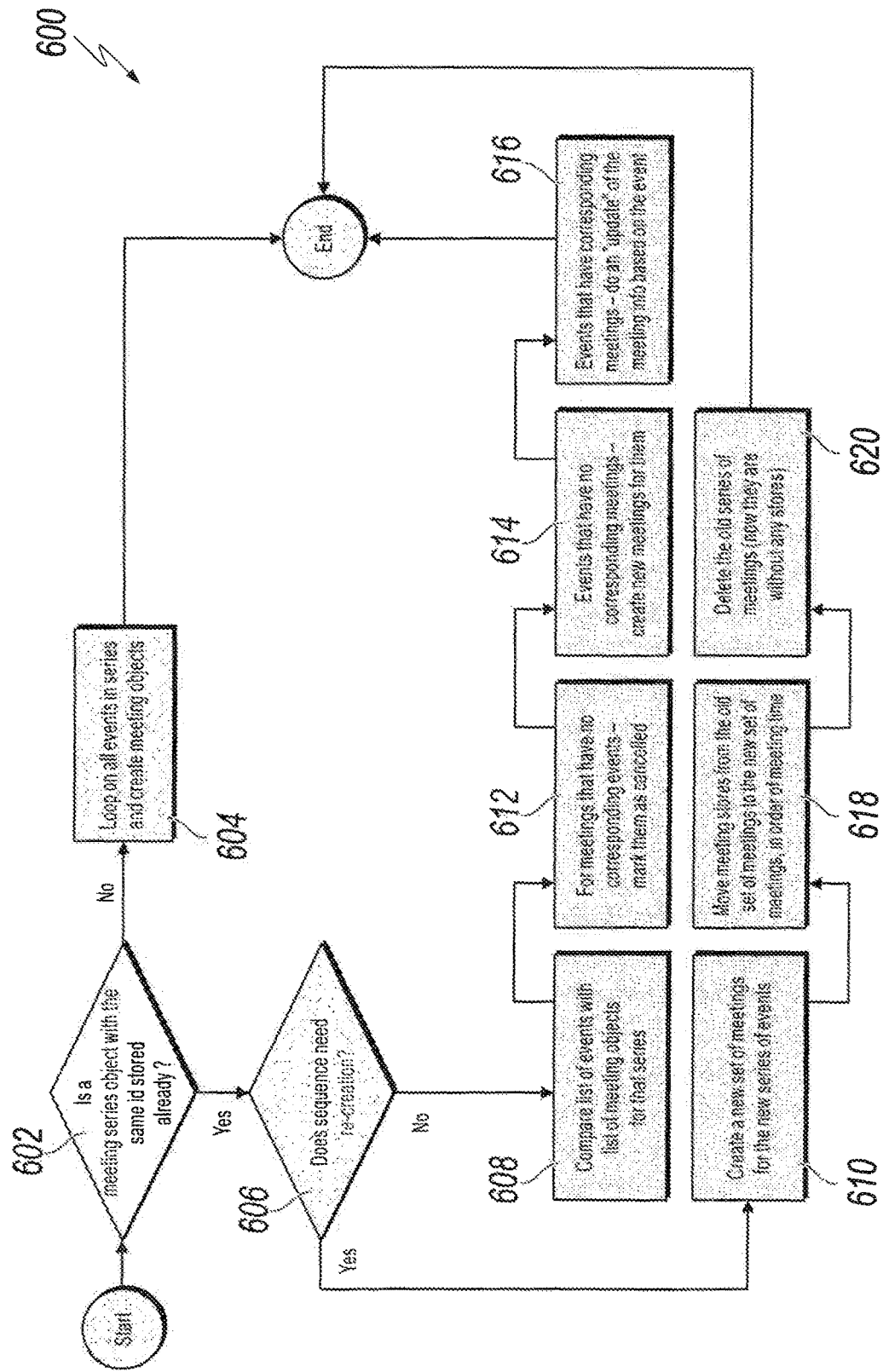
FIG. 6 is a flowchart illustrating an example of a computer-implemented method for processing event information for a meeting series, according to an implementation of the present disclosure.

FIG. 6 is a flowchart illustrating an example of a computer-implemented method 600 for processing event information for a meeting series, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a determination is made, in response to receiving event information for a time series, as to whether a stored meeting series object exists with a same identifier as an event identifier in the received information. If it is determined that a stored meeting series object with a same identifier does not exist, method 600 proceeds to 604. Otherwise, if it is determined that a stored meeting series object with a same identifier exists, method 600 proceeds to 606.

At 604, for each event in the received times series event information, a corresponding meeting object is created. Each created meeting object can include information included in a corresponding event. After 604, method 600 can stop.

At 606, a determination is made as to whether a meeting sequence needs to be recreated. Different types of event information, from different types of systems, may cause a need to recreate a meeting sequence. For example, for event information received from a first type of calendar system, a meeting sequence may need to be recreated only if a series recurrence pattern has changed (for example, from daily to weekly). As another example, for event information received from a second type of calendar system, a meeting sequence may need to be recreated if a series recurrence pattern has changed or if a meeting time has changed (for example, from 10:00 AM to 10:30 AM). If it is determined that the meeting sequence does not need re-creation, method 600 proceeds to 608. Otherwise, if it is determined that the meeting sequence needs re-creation, method 600 proceeds to 610.

At 608, a list of events in the received event information is compared to a list of meeting objects in the stored meeting sequence. Results of the comparison can be meeting objects that have no corresponding events, events that have no corresponding meeting objects, events that have corresponding meeting objects with no changed information between the corresponding events and meeting objects, and events that have corresponding meeting objects with changed information between the corresponding events and meeting objects. From 608, method 600 proceeds to 612.

At 612, for each meeting object that has no corresponding events, the meeting object is marked as cancelled.

Figure 7:
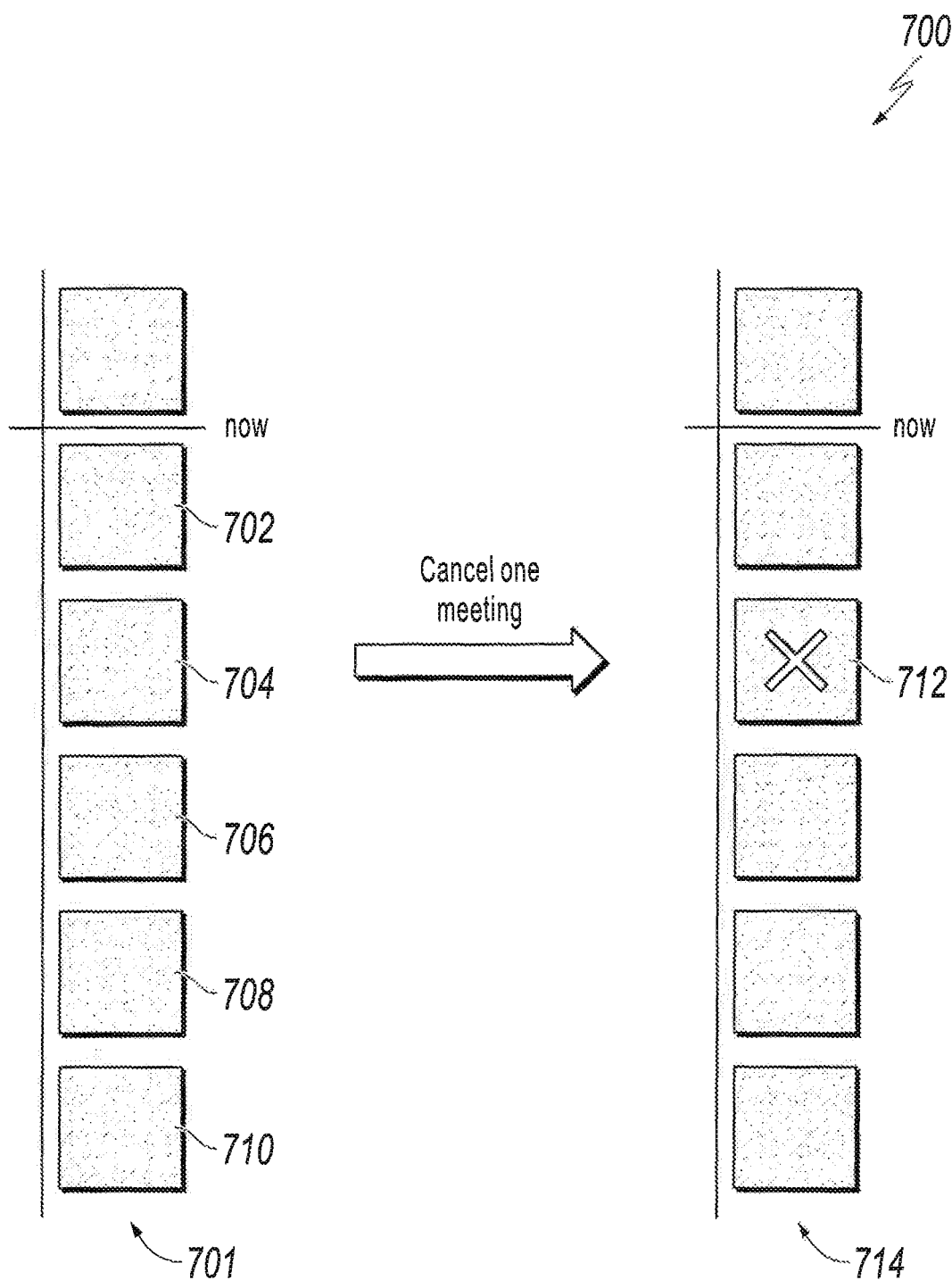
FIG. 7 is a block diagram illustrating cancelling a meeting in a series, according to an implementation of the present disclosure.

FIG. 7 is a block diagram 700 illustrating cancelling of a meeting in a series. A meeting store 701 includes meeting objects 702, 704, 706, 708, and 710. Received event information for a meeting series may include events corresponding to the meeting objects 702, 706, 708, and 710, but not the meeting object 704. Accordingly, the meeting object 704 can be marked as cancelled, as illustrated by a marked meeting object 712 that corresponds to the meeting object 704, in an updated meeting store 714.

Referring again to FIG. 6, from 612, method 600 proceeds to 614.

At 614, for each event that has no corresponding meeting object, a new meeting object is created based on the event. From 614, method 600 proceeds to 616.

At 616, for each event that has a corresponding meeting object with changed information between the event and the meeting object, the meeting object is updated based on the event. After 616, method 600 can stop.

At 610, a new set of meeting objects is created. From 610, method 600 proceeds to 618.

At 618, meeting stores from an old meeting series are moved (or otherwise linked) to the new set of meeting objects. Meeting stores can be moved (or linked) in an order of meeting time. From 618, method 600 proceeds to 620.

At 620, the old meeting series, which no longer has any meeting stores, is deleted. After 620, method 600 can stop.

Figure 8:
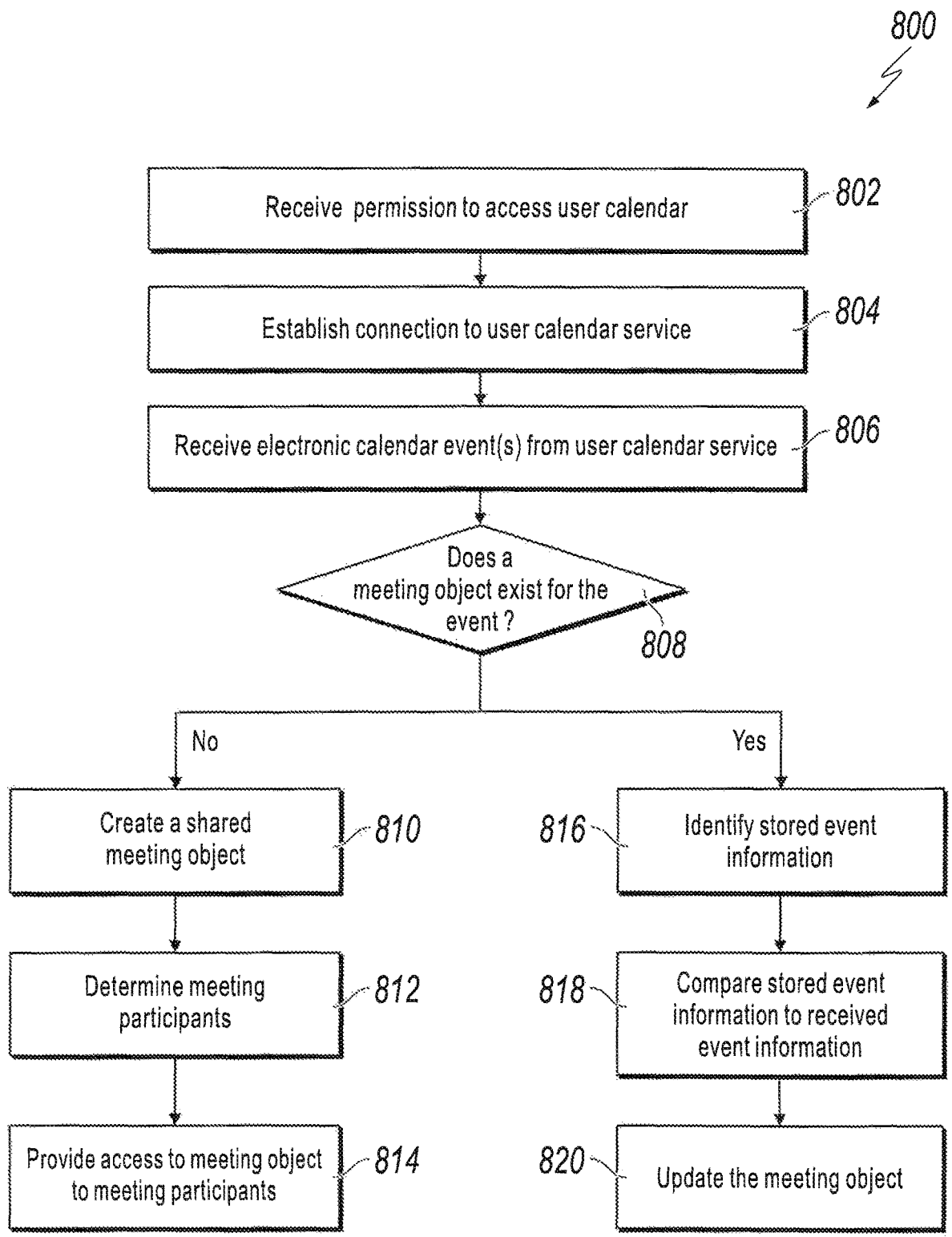
FIG. 8 is a flowchart illustrating an example of a computer-implemented method for managing shared collaborative electronic events, according to an implementation of the present disclosure.

FIG. 8 is a flowchart illustrating an example of a computer-implemented method 800 for managing shared collaborative electronic events, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate.

In some implementations, various steps of method 800 can be run in parallel, in combination, in loops, or in any order.

At 802, permission from a first user to access electronic calendar information for the first user from a user calendar service is received, at a shared calendar service. The first user can provide explicit permission for the shared calendar service to access, using the user calendar service, a calendar owned by the first user. Connectivity tokens for accessing the user calendar service on behalf of the first user can be stored and used for subsequent access to the calendar of the first user. In some implementations, the shared calendar service can be whitelisted to enable access to the user calendar service for the first user. From 802, method 800 proceeds to 804.

At 804, a connection to the user calendar service is established, by the shared calendar service. In some implementations, previously-stored communication tokens can be used to access the user calendar service. In some implementations, the shared calendar service supports connecting to a predefined set of one or more user calendar services. From 804, method 800 proceeds to 806.

At 806, at least one electronic calendar event for the first user is received, using the connection, from the user calendar service. The shared calendar service can pull event information from the user calendar service. As another example, the shared calendar service can receive notifications about new or changed event information, from the user calendar service. From 806, method 800 proceeds to 808.

At 808, a determination is made, for each received electronic calendar event, as to whether a shared meeting object corresponding to the electronic calendar event exists in a shared meeting object store managed by the shared calendar service. As previously described, determining whether a shared meeting object corresponding to the electronic calendar event exists in the shared meeting object store can include checking for and comparing different types of identifiers and/or evaluation of heuristics that include evaluation of one or more of non-identifier fields such as meeting start and end times, meeting participants, and a meeting title.

If it is determined, for a first electronic calendar event, that no shared meeting object corresponding to the first electronic calendar event exists in the shared meeting object store, method 800 proceeds to 810. Otherwise, if it is determined that a second shared meeting object corresponding to a second electronic calendar event exists in the shared meeting object store, method 800 proceeds to 816.

At 810, a first shared meeting object is created in the shared meeting object store for the first electronic calendar event. The first shared meeting object can include, or can be linked to, shared meeting content, such as topics, notes, documents, images, or other types of content. From 810, method 800 proceeds to 812.

At 812, meeting participants for the first electronic calendar event are determined. The determined meeting participants include the first user and at least one other user. From 812, method 800 proceeds to 814.

At 814, access to the first shared meeting object is provided to each determined meeting participant. Providing access to the first shared meeting object includes enabling each meeting participant to add shared content to the first shared meeting object and view shared content added by other meeting participants. After 814, method 800 can stop.

At 816, stored calendar event information is identified for the second shared meeting object. From 816, method 800 proceeds to 818.

At 818, the stored calendar event information is compared to the first electronic calendar event. From 818, method 800 proceeds to 820.

At 820, the second shared meeting object is updated, based on a determined difference between the stored calendar event information and the first electronic calendar event. The determined difference can be a change to a meeting title, a change to a meeting start or end time, a change in meeting participants, or an indication that a meeting has been cancelled.

If a change to meeting participants has occurred, permissions to the shared meeting object can be adjusted. In some implementations, if a first user has been deleted from the meeting and a second user has been added to the meeting, the system can prompt a meeting owner asking if the second user should have access to shared meeting content that may have been added by (and may be confidential to) the first user. The meeting owner may have changed meeting participants when actually intending on creating a new meeting with different participants, for example. The system can prompt the meeting owner to confirm if a new meeting is desired (with a cancel of an earlier meeting), or if the meeting owner intended just to change participants of an existing meeting and to leave existing shared content intact, accessible by the second user. After 820, method 800 can stop.

FIGS. 9 to 13 are examples of user interfaces of a shared calendar application, according to an implementation of the present disclosure.

Figure 9:
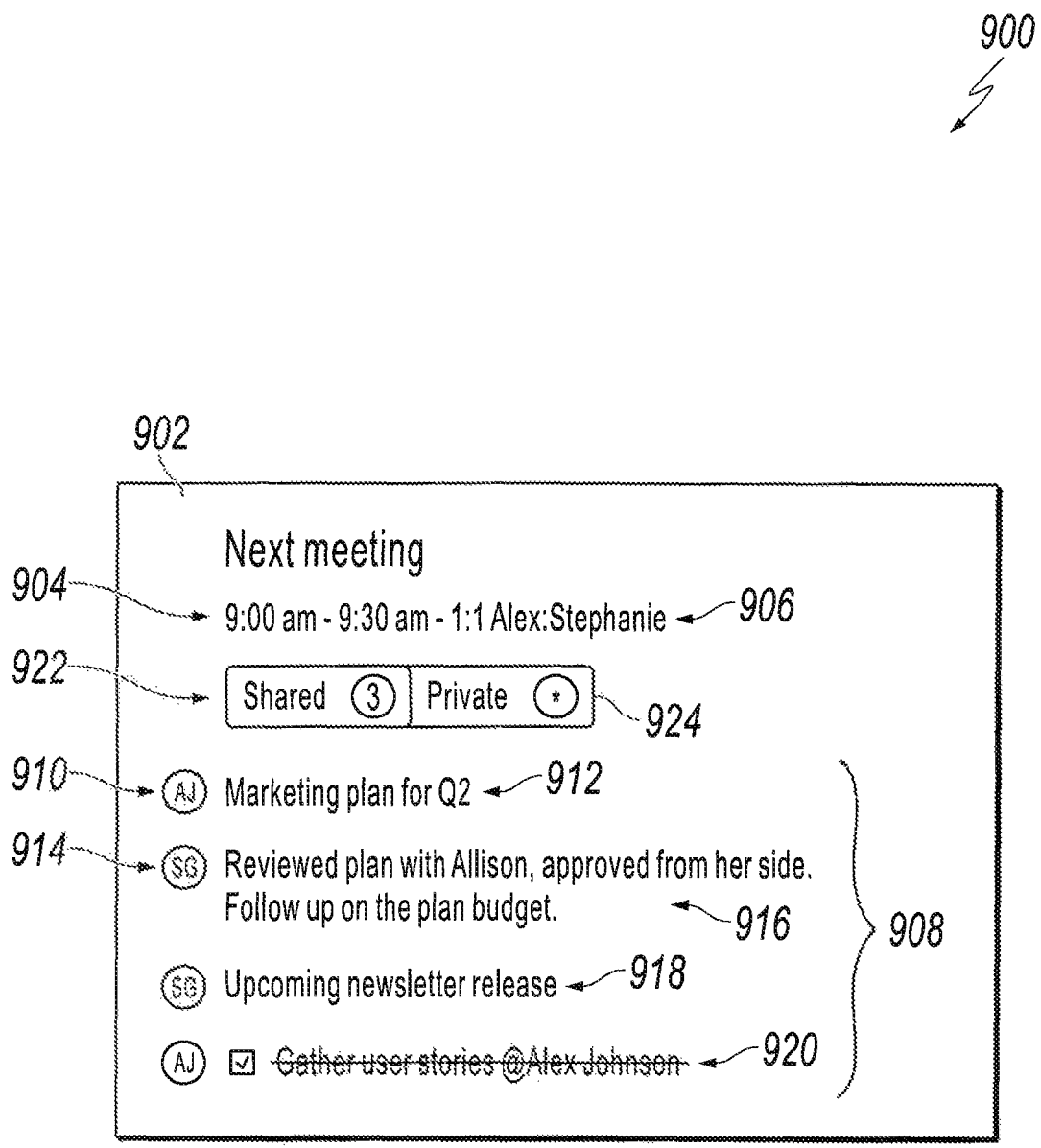
FIGS. 9, 10, 11, 12A, 12B, and 13 are examples of user interfaces of a shared calendar application, according to an implementation of the present disclosure.

FIG. 9 is an example of a user interface 900 for a shared calendar application. The user interface 900 is a portion of the shared calendar application that shows information for an upcoming meeting 902. Meeting time information 904 and meeting participant information 906 are displayed (and can reflect calendar event information obtained from one or more user calendars).

A meeting topic area 908 includes shared meeting topic and note content added by multiple meeting participants. For example, a user Alex (as indicated by initials 910) has added a topic 912 and a user Stephanie (as indicated by initials 914) has added a note 916. Topics can be broader categories of meeting content and notes can be sub-items underneath topics, in some examples. As another example, user Stephanie has added a topic 918 and user Alex has added an action item note 920 to the topic 918.

The displayed topics are part of a shared content area that can be displayed in the user interface 900 in response to selection of a shared-content button 922. A private content area can be displayed in response to selection of a private-content button 924. The private content area can display content visible only to a content creator. For example, if user Stephanie is viewing the user interface 900, she can select the private-content button 924, and add private notes related to the meeting. User Alex cannot view user Stephanie's private content (and vice versa).

In some implementations, shared content is append-only, in that user Alex can't modify topics or notes added by user Stephanie, for example. In such examples, each user can add new topics, notes, or comments (or other types of shared content), but can't modify content added by other participants. In other implementations, shared content is editable by any participant. For instance, a shared content area can be a wiki that includes collaborative content that can be added and edited by any participant. In some examples, different user roles may exist, with different editing permissions. For instance, some users may only be able to add new content whereas other users may be able to add content and edit or delete other users' content. In some examples, a topic creator can delete a topic (and consequently delete all notes added to the topic, whether added by the topic creator or other users).

With a meeting object, shared (and private) content can be added, by meeting participants, before, during, or after a meeting. In some implementations, modification of meeting content can be locked after a predetermined amount of time (for example, one week) after a meeting has ended. A meeting object can represent what is desired to discuss, or what has been discussed, in an actual meeting. Accordingly, indefinite modification of meeting content after a meeting has ended can be prevented. A user can edit meeting content for a period of time after the meeting, for a meeting summary, or for post-meeting commentary, but a configurable lock time point can be established, for some or all meetings, to make the meeting content eventually be an immutable representation of meeting proceedings and discussion.

The shared calendar system can automatically send electronic notifications to user(s) before and/or after a meeting. A reminder message can be sent before the meeting reminding users to prepare for the meeting and/or to participate in creating a shared agenda for the meeting. An invitation can be sent after the meeting inviting users to contribute to a meeting summary section. Each message sent from the shared calendar system can include copies and/or links to shared content for the meeting.

Figure 10:
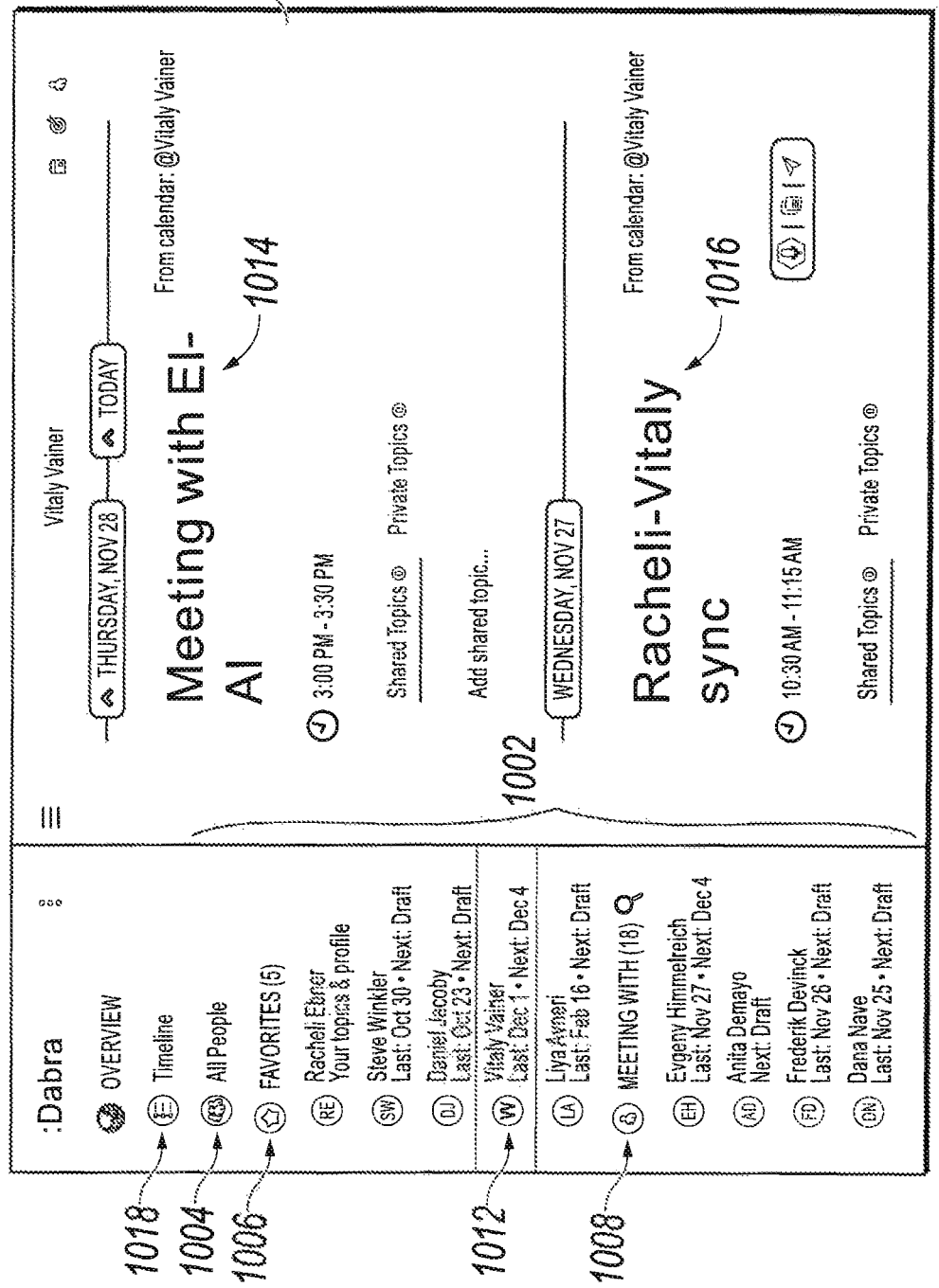

FIG. 10 is an example of a user interface 1000 for a shared calendar application. A shared calendar application can present meetings according to user relationship or in a timeline view. For instance, the user interface 1000 includes a relationship area 1002 that displays users to which a current user is related based on having at least one meeting with each related user. All relationships can be displayed by selecting an all-people item 1004. Favorite relationships can be displayed in a favorites area 1006. Other related users can be displayed in a meeting-with area 1008.

A particular relationship can be selected, in the relationship area 1002, to have meetings that include the related user and the current user displayed in a meetings area 1010. For instance, a Vitaly relationship 1012 has been selected. Accordingly, a first meeting 1014 and a second meeting 1016, each including a Vitaly user and the current user, are displayed in the meetings area 1010. If the current user desires to display meetings based on time, or in a calendar view, rather than by relationship, a timeline item can be selected. In some implementations, a combination of a relationship view and a calendar view can be displayed. For instance, a calendar widget can be displayed, for example next to the relationship area. In response to selection of a relationship, calendar dates on which a meeting with the related user occur can be distinguished (for example, displayed in a bold font to distinguish from other dates).

Figure 11:
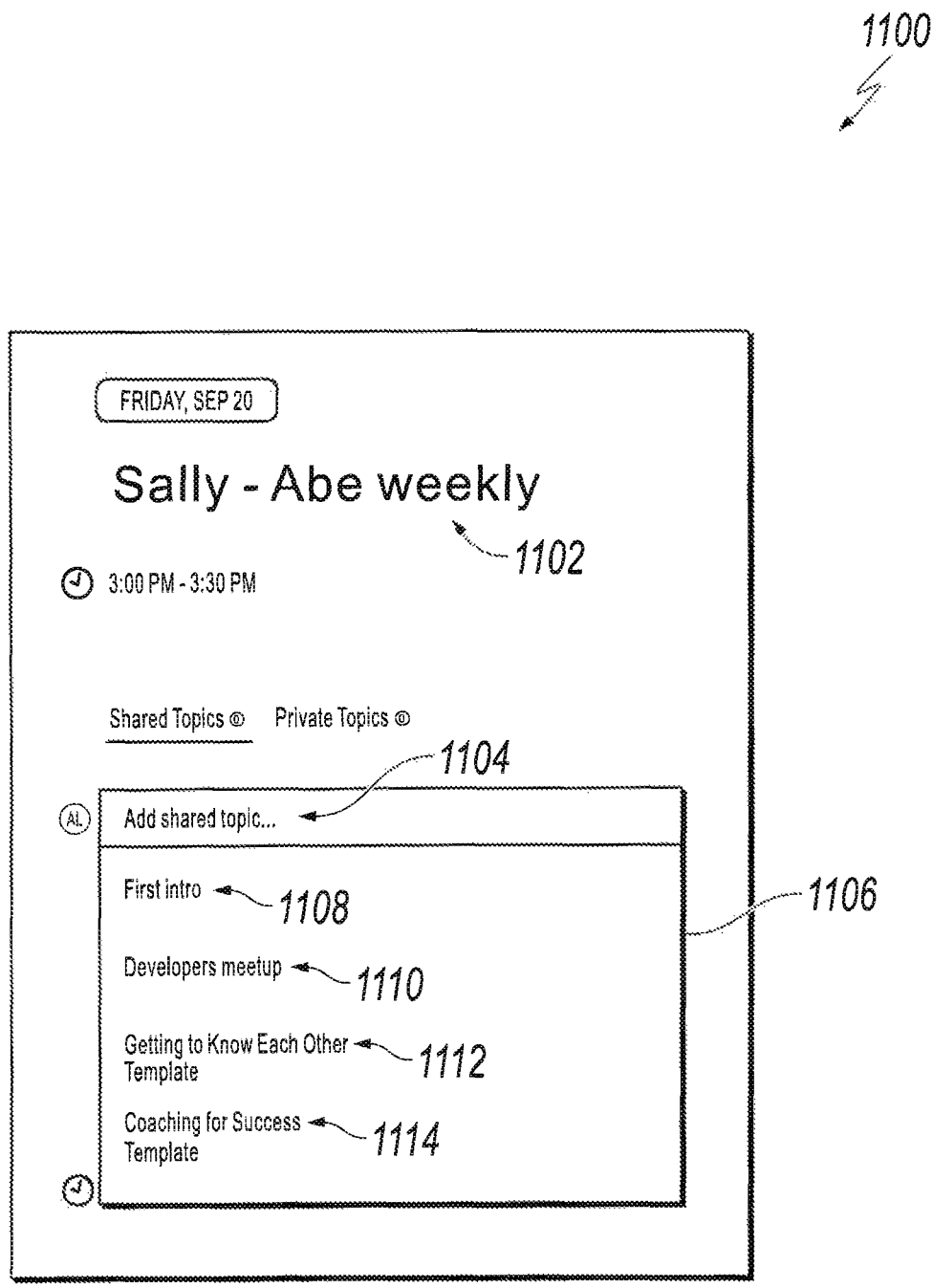

FIG. 11 is an example of a user interface 1100 for a shared calendar application. The user interface 1100 illustrates topic suggestion for a meeting 1102. A user has selected a topic entry control 1104. In response to selection of the topic entry control 1104, a topic suggestion list 1106 is displayed that includes topic suggestions 1108, 1110, 1112, and 1114. Topic suggestions can be determined based on a number of different factors. For example, topic suggestions can be determined based on previously-used topics, predefined topics, topics generated from topic templates, or participants in the meeting (for example, based on past use in similar meetings and/or based on relationship(s) between the user and participant(s) in the meeting).

Figure 12A:
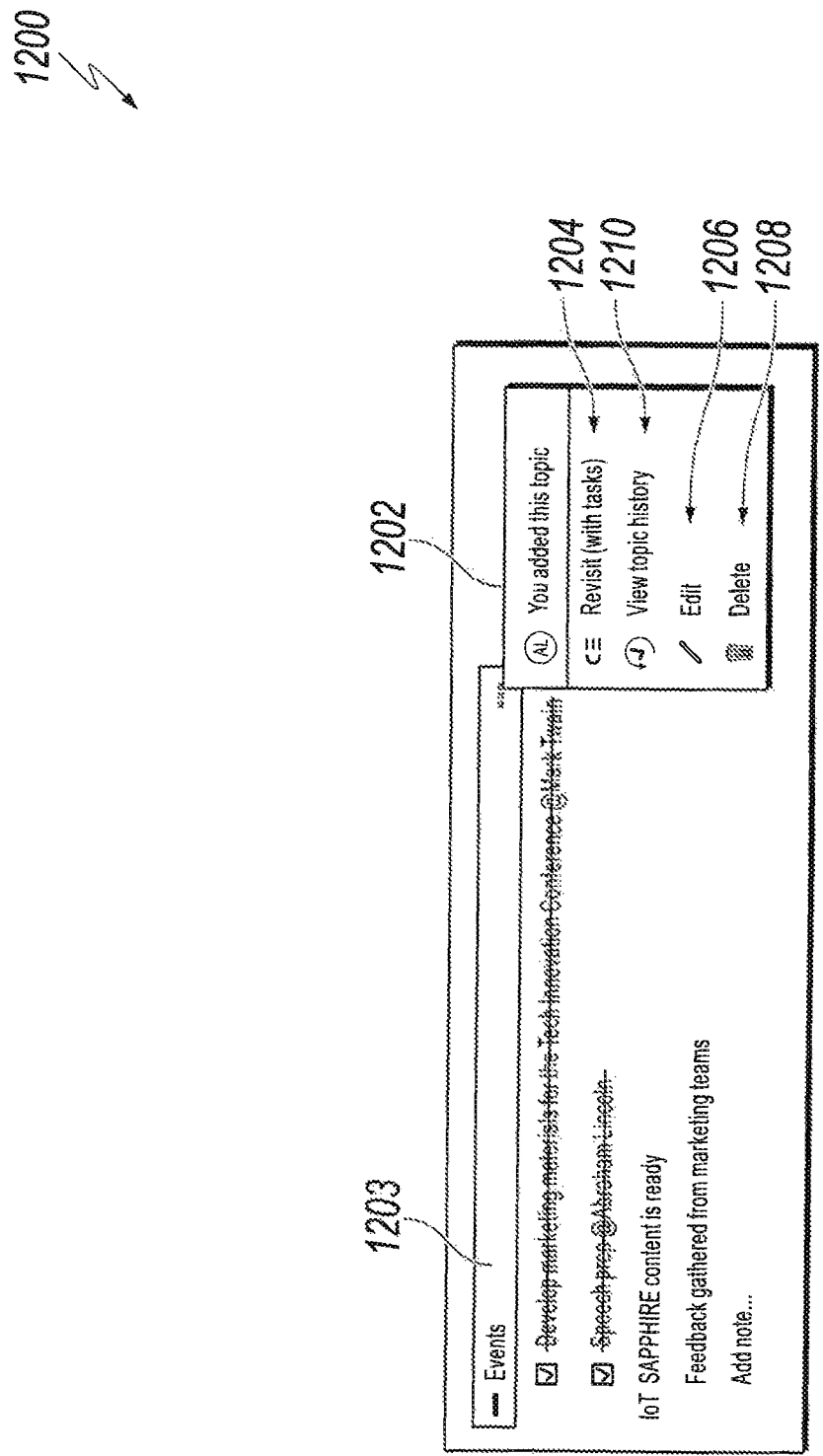

FIG. 12A is an example of a user interface 1200 for a shared calendar application. The user interface 1200 includes a topic menu 1202 that can be displayed in response to selection of a topic such as a topic 1203. The topic menu 1202 includes a revisit item 1204 that can be selected to automatically add a copy of the topic 1203 to an upcoming meeting (for example, a next meeting in a series or a next meeting that is automatically created with same participants as a current meeting in response to selection of the revisit item 1204).

An edit item 1206 or a delete item 1208 can be selected to edit or delete the topic 1203, respectively. A view topic history item 1210 can be selected to view history (for example, previous uses) of the topic 1203. Topic history is discussed in the following description of FIG. 12B.

Figure 12B:

FIG. 12B is an example of a user interface 1250 for a shared calendar application. The user interface 1250 displays topic history for a selected topic. Topic history can represent an aggregation of all past times a topic was discussed and corresponding notes in a context of a relationship. The user interface 1250 displays topic history for a topic instance 1252, which, as indicated by a note 1254, was created one day ago. A topic history section 1255 indicates that other instances 1256, 1258, and 1260 of a same topic were discussed in other, previous meetings. Topic histories can enable a user to review all the discussions the user had with a particular person and to drill down on a particular topic to view when and what was discussed on the topic across the entire time span of a relationship with the person.

Figure 13:
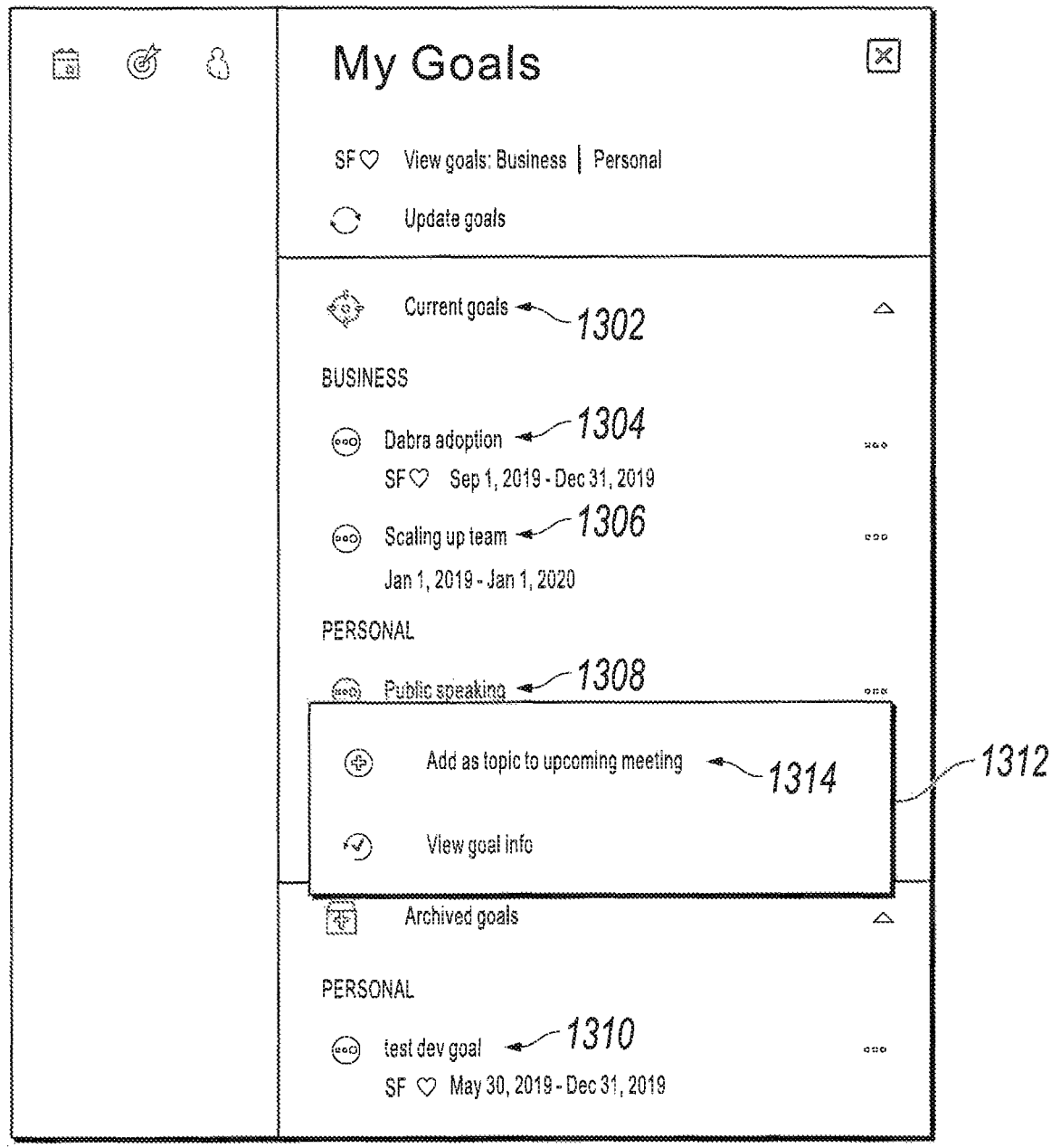

FIG. 13 is an example of a user interface 1300 for a shared calendar application. The user interface 1300 displays goal information obtained from an external goal management application (for example, a human resources application). For instance, a goal area 1302 displays goals 1304, 1306, 1308, and 1310. A goal menu 1312 is displayed in response to selection of the goal 1308. The goal menu 1312 includes an add-as-topic item 1314 that can be selected to add the goal 1308 as a topic for an upcoming meeting, for example, between the user and the user's manager. Although goal application integration is discussed, the shared calendar application can integrate with other applications, and information from other applications can be used within the shared calendar application, when the other information can be mapped, for example, to a shared calendar application user, relationship, meeting, or other data item.

Figure 14:
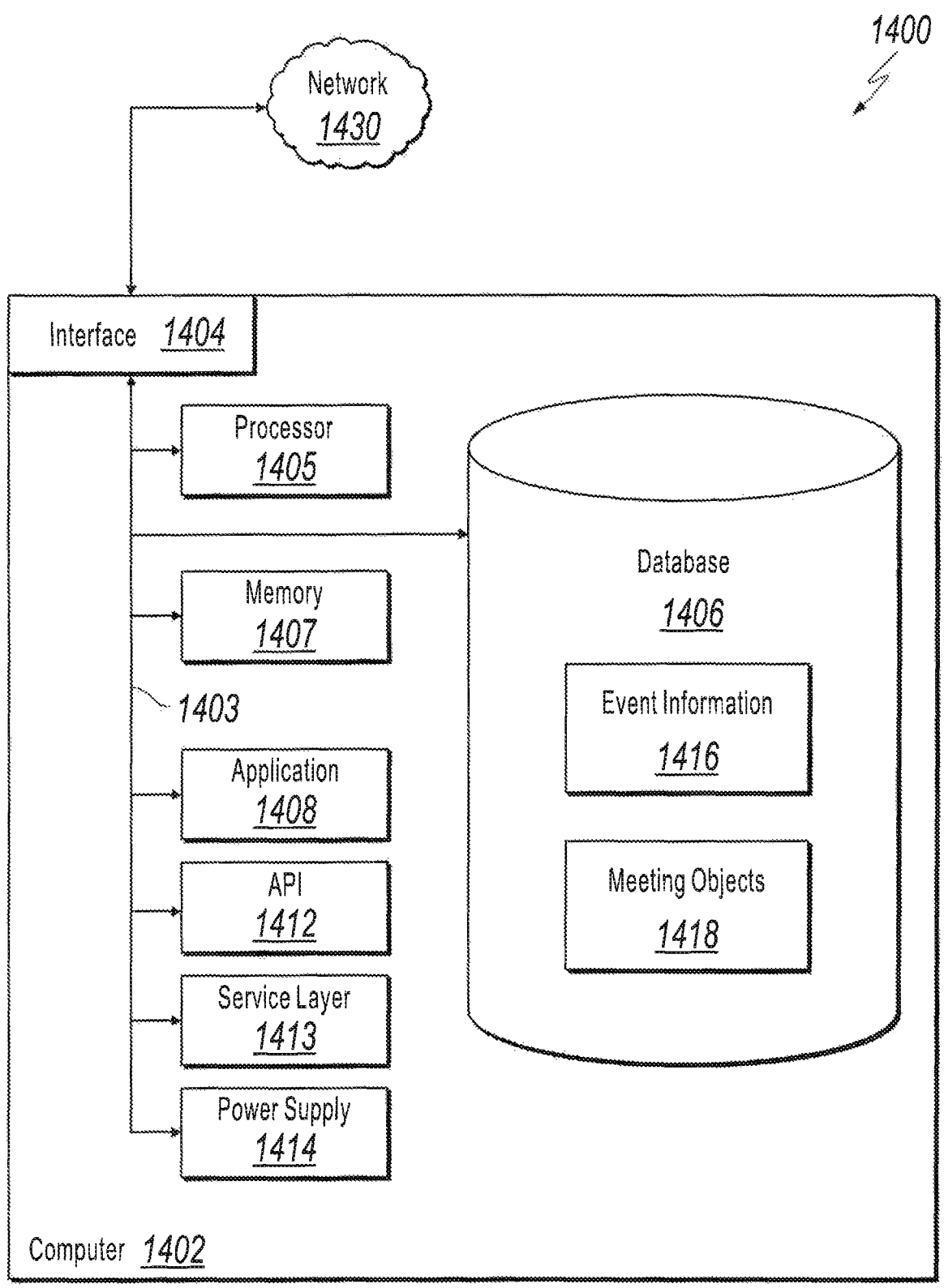
FIG. 14 is a block diagram illustrating an example of a computer-implemented system used to provide computational functionalities associated with described algorithms, methods, functions, processes, flows, and procedures, according to an implementation of the present disclosure.

FIG. 14 is a block diagram illustrating an example of a computer-implemented System 1400 used to provide computational functionalities associated with described algorithms, methods, functions, processes, flows, and procedures, according to an implementation of the present disclosure. In the illustrated implementation, System 1400 includes a Computer 1402 and a Network 1430.

The illustrated Computer 1402 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 1402 can include an input device, such as a keypad, keyboard, or touch screen, or a combination of input devices that can accept user information, and an output device that conveys information associated with the operation of the Computer 1402, including digital data, visual, audio, another type of information, or a combination of types of information, on a graphical-type user interface (UI) (or GUI) or other UI.

The Computer 1402 can serve in a role in a distributed computing system as, for example, a client, network component, a server, or a database or another persistency, or a combination of roles for performing the subject matter described in the present disclosure. The illustrated Computer 1402 is communicably coupled with a Network 1430. In some implementations, one or more components of the Computer 1402 can be configured to operate within an environment, or a combination of environments, including cloud-computing, local, or global.

At a high level, the Computer 1402 is an electronic computing device operable to receive, transmit, process, store, or manage data and information associated with the described subject matter. According to some implementations, the Computer 1402 can also include or be communicably coupled with a server, such as an application server, e-mail server, web server, caching server, or streaming data server, or a combination of servers.

The Computer 1402 can receive requests over Network 1430 (for example, from a client software application executing on another Computer 1402) and respond to the received requests by processing the received requests using a software application or a combination of software applications. In addition, requests can also be sent to the Computer 1402 from internal users (for example, from a command console or by another internal access method), external or third-parties, or other entities, individuals, systems, or computers.

Each of the components of the Computer 1402 can communicate using a System Bus 1403. In some implementations, any or all of the components of the Computer 1402, including hardware, software, or a combination of hardware and software, can interface over the System Bus 1403 using an application programming interface (API) 1412, a Service Layer 1413, or a combination of the API 1412 and Service Layer 1413. The API 1412 can include specifications for routines, data structures, and object classes. The API 1412 can be either computer-language independent or dependent and refer to a complete interface, a single function, or even a set of APIs. The Service Layer 1413 provides software services to the Computer 1402 or other components (whether illustrated or not) that are communicably coupled to the Computer 1402. The functionality of the Computer 1402 can be accessible for all service consumers using the Service Layer 1413. Software services, such as those provided by the Service Layer 1413, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 1402, alternative implementations can illustrate the API 1412 or the Service Layer 1413 as stand-alone components in relation to other components of the Computer 1402 or other components (whether illustrated or not) that are communicably coupled to the Computer 1402. Moreover, any or all parts of the API 1412 or the Service Layer 1413 can be implemented as a child or a sub-module of another software module, enterprise application, or hardware module without departing from the scope of the present disclosure.

The Computer 1402 includes an Interface 1404. Although illustrated as a single Interface 1404, two or more Interfaces 1404 can be used according to particular needs, desires, or particular implementations of the Computer 1402. The Interface 1404 is used by the Computer 1402 for communicating with another computing system (whether illustrated or not) that is communicatively linked to the Network 1430 in a distributed environment. Generally, the Interface 1404 is operable to communicate with the Network 1430 and includes logic encoded in software, hardware, or a combination of software and hardware. More specifically, the Interface 1404 can include software supporting one or more communication protocols associated with communications such that the Network 1430 or hardware of Interface 1404 is operable to communicate physical signals within and outside of the illustrated Computer 1402.

The Computer 1402 includes a Processor 1405. Although illustrated as a single Processor 1405, two or more Processors 1405 can be used according to particular needs, desires, or particular implementations of the Computer 1402. Generally, the Processor 1405 executes instructions and manipulates data to perform the operations of the Computer 1402 and any algorithms, methods, functions, processes, flows, and procedures as described in the present disclosure.

The Computer 1402 also includes a Database 1406 that can hold data for the Computer 1402, another component communicatively linked to the Network 1430 (whether illustrated or not), or a combination of the Computer 1402 and another component. For example, Database 1406 can be an in-memory or conventional database storing data consistent with the present disclosure. In some implementations, Database 1406 can be a combination of two or more different database types (for example, a hybrid in-memory and conventional database) according to particular needs, desires, or particular implementations of the Computer 1402 and the described functionality. Although illustrated as a single Database 1406, two or more databases of similar or differing types can be used according to particular needs, desires, or particular implementations of the Computer 1402 and the described functionality. While Database 1406 is illustrated as an integral component of the Computer 1402, in alternative implementations, Database 1406 can be external to the Computer 1402. As illustrated, the Database 1406 holds the previously described event information 1416 and meeting objects 1418.

The Computer 1402 also includes a Memory 1407 that can hold data for the Computer 1402, another component or components communicatively linked to the Network 1430 (whether illustrated or not), or a combination of the Computer 1402 and another component. Memory 1407 can store any data consistent with the present disclosure. In some implementations, Memory 1407 can be a combination of two or more different types of memory (for example, a combination of semiconductor and magnetic storage) according to particular needs, desires, or particular implementations of the Computer 1402 and the described functionality. Although illustrated as a single Memory 1407, two or more Memories 1407 or similar or differing types can be used according to particular needs, desires, or particular implementations of the Computer 1402 and the described functionality. While Memory 1407 is illustrated as an integral component of the Computer 1402, in alternative implementations, Memory 1407 can be external to the Computer 1402.

The Application 1408 is an algorithmic software engine providing functionality according to particular needs, desires, or particular implementations of the Computer 1402, particularly with respect to functionality described in the present disclosure. For example, Application 1408 can serve as one or more components, modules, or applications. Further, although illustrated as a single Application 1408, the Application 1408 can be implemented as multiple Applications 1408 on the Computer 1402. In addition, although illustrated as integral to the Computer 1402, in alternative implementations, the Application 1408 can be external to the Computer 1402.

The Computer 1402 can also include a Power Supply 1414. The Power Supply 1414 can include a rechargeable or non-rechargeable battery that can be configured to be either user- or non-user-replaceable. In some implementations, the Power Supply 1414 can include power-conversion or management circuits (including recharging, standby, or another power management functionality). In some implementations, the Power Supply 1414 can include a power plug to allow the Computer 1402 to be plugged into a wall socket or another power source to, for example, power the Computer 1402 or recharge a rechargeable battery.

There can be any number of Computers 1402 associated with, or external to, a computer system containing Computer 1402, each Computer 1402 communicating over Network 1430. Further, the term "client," "user," or other appropriate terminology can be used interchangeably, as appropriate, without departing from the scope of the present disclosure. Moreover, the present disclosure contemplates that many users can use one Computer 1402, or that one user can use multiple computers 1402.

Described implementations of the subject matter can include one or more features, alone or in combination.

For example, in a first implementation, a computer implemented method comprises: receiving, at a shared calendar service, permission from a first user to access electronic calendar information for the first user from a user calendar service; establishing, by the shared calendar service, a connection to the user calendar service; receiving, using the connection, at least one electronic calendar event for the first user, from the user calendar service; determining, for each received electronic calendar event for the first user, whether a shared meeting object corresponding to the electronic calendar event exists in a shared meeting object store managed by the shared calendar service; in response to determining that no shared meeting object corresponding to a first electronic calendar event exists in the shared meeting object store: creating a first shared meeting object in the shared meeting object store for the first electronic calendar event; determining meeting participants for the first electronic calendar event, wherein the determined meeting participants include the first user and at least one other user; and providing access to the first shared meeting object to each determined meeting participant, wherein providing access to the first shared meeting object includes enabling each meeting participant to add shared content to the first shared meeting object and view shared content added by other meeting participants; and in response to determining that a second shared meeting object corresponding to a second electronic calendar event exists in the shared meeting object store, updating the second shared meeting object based on the second electronic calendar event.

The foregoing and other described implementations can each, optionally, include one or more of the following features:

A first feature, combinable with any of the following features, wherein updating the second shared meeting object based on the second electronic calendar event comprises: identifying stored calendar event information for the second shared meeting object; comparing the stored calendar event information to the second electronic calendar event; and updating the second shared meeting object, based on a determined difference between the stored calendar event information and the second electronic calendar event.

A second feature, combinable with any of the following features, wherein the determined difference corresponds to a change in meeting participants.

A third feature, combinable with any of the following features, wherein the determined difference corresponds to a change in a meeting title.

A fourth feature, combinable with any of the following features, wherein the determined difference corresponds to a change in meeting time.

A fifth feature, combinable with any of the following features, wherein the determined difference indicates that a meeting has been cancelled.

A sixth feature, combinable with any of the following features, wherein the second shared meeting object was previously added to the shared meeting object store based on the shared calendar service receiving electronic calendar event information for a second user, wherein the second user is different from the first user.

A seventh feature, combinable with any of the following features, wherein the connection is established in response to execution for the first user of a shared calendar application.

An eighth feature, combinable with any of the following features, further comprising determining one or more meetings in which the first user is a participant and presenting, in the shared calendar application, for each determined meeting, meeting information from a corresponding shared meeting object, wherein the meeting information includes shared content for the shared meeting object.

A ninth feature, combinable with any of the following features, further comprising: receiving, from the first user, new shared content for a first meeting; and storing the new shared content in association with the first shared meeting object.

A tenth feature, combinable with any of the following features, wherein the new shared content comprises one of a new topic, a new note, a new link, a new comment, a new file, or a new media item.

An eleventh feature, combinable with any of the following features, wherein the new shared content is retrieved from an external system, where content or object can be mapped onto a shared meeting object, or relationship.

A twelfth feature, combinable with any of the following features, further comprising: determining one or more relationships for the first user, wherein each relationship is based on the first user participating in at least one meeting with another user; and presenting relationship information for the determined relationships in the shared calendar application.

A thirteenth feature, combinable with any of the following features, further comprising: receiving event information indicating a change in a meeting series; identifying multiple meeting store objects corresponding to the meeting series; and updating each of the multiple meeting store objects based on the indicated change in the meeting series.

A fourteenth feature, combinable with any of the following features, wherein the second shared meeting object is updated based on determining that the second electronic calendar event includes changes to a leading calendar.

A fifteenth feature, combinable with any of the following features, wherein the leading calendar is a calendar of a creator of a meeting corresponding to the second electronic calendar event.

In a second implementation, a non-transitory, computer-readable medium stores one or more instructions executable by a computer system to perform operations comprising: receiving, at a shared calendar service, permission from a first user to access electronic calendar information for the first user from a user calendar service; establishing, by the shared calendar service, a connection to the user calendar service; receiving, using the connection, at least one electronic calendar event for the first user, from the user calendar service; determining, for each received electronic calendar event for the first user, whether a shared meeting object corresponding to the electronic calendar event exists in a shared meeting object store managed by the shared calendar service; in response to determining that no shared meeting object corresponding to a first electronic calendar event exists in the shared meeting object store: creating a first shared meeting object in the shared meeting object store for the first electronic calendar event; determining meeting participants for the first electronic calendar event, wherein the determined meeting participants include the first user and at least one other user; and providing access to the first shared meeting object to each determined meeting participant, wherein providing access to the first shared meeting object includes enabling each meeting participant to add shared content to the first shared meeting object and view shared content added by other meeting participants; and in response to determining that a second shared meeting object corresponding to a second electronic calendar event exists in the shared meeting object store, updating the second shared meeting object based on the second electronic calendar event.

The foregoing and other described implementations can each, optionally, include one or more of the following features:

A first feature, combinable with any of the following features, wherein updating the second shared meeting object based on the second electronic calendar event comprises: identifying stored calendar event information for the second shared meeting object; comparing the stored calendar event information to the second electronic calendar event; and updating the second shared meeting object, based on a determined difference between the stored calendar event information and the second electronic calendar event.

A second feature, combinable with any of the following features, wherein the determined difference corresponds to a change in meeting participants.

A third feature, combinable with any of the following features, wherein the determined difference corresponds to a change in a meeting title.

A fourth feature, combinable with any of the following features, wherein the determined difference corresponds to a change in meeting time.

A fifth feature, combinable with any of the following features, wherein the determined difference indicates that a meeting has been cancelled.

A sixth feature, combinable with any of the following features, wherein the second shared meeting object was previously added to the shared meeting object store based on the shared calendar service receiving electronic calendar event information for a second user, wherein the second user is different from the first user.

A seventh feature, combinable with any of the following features, wherein the connection is established in response to execution for the first user of a shared calendar application.

An eighth feature, combinable with any of the following features, further comprising determining one or more meetings in which the first user is a participant and presenting, in the shared calendar application, for each determined meeting, meeting information from a corresponding shared meeting object, wherein the meeting information includes shared content for the shared meeting object.

A ninth feature, combinable with any of the following features, further comprising: receiving, from the first user, new shared content for a first meeting; and storing the new shared content in association with the first shared meeting object.

A tenth feature, combinable with any of the following features, wherein the new shared content comprises one of a new topic, a new note, a new link, a new comment, a new file, or a new media item.

An eleventh feature, combinable with any of the following features, wherein the new shared content is retrieved from an external system, where content or object can be mapped onto a shared meeting object, or relationship.

A twelfth feature, combinable with any of the following features, further comprising: determining one or more relationships for the first user, wherein each relationship is based on the first user participating in at least one meeting with another user; and presenting relationship information for the determined relationships in the shared calendar application.

A thirteenth feature, combinable with any of the following features, further comprising: receiving event information indicating a change in a meeting series; identifying multiple meeting store objects corresponding to the meeting series; and updating each of the multiple meeting store objects based on the indicated change in the meeting series.

A fourteenth feature, combinable with any of the following features, wherein the second shared meeting object is updated based on determining that the second electronic calendar event includes changes to a leading calendar.

A fifteenth feature, combinable with any of the following features, wherein the leading calendar is a calendar of a creator of a meeting corresponding to the second electronic calendar event.

In a third implementation, a computer-implemented system, comprises one or more computers and one or more computer memory devices interoperably coupled with the one or more computers and having tangible, non-transitory, machine-readable media storing one or more instructions that, when executed by the one or more computers, perform one or more operations comprising: receiving, at a shared calendar service, permission from a first user to access electronic calendar information for the first user from a user calendar service; establishing, by the shared calendar service, a connection to the user calendar service; receiving, using the connection, at least one electronic calendar event for the first user, from the user calendar service; determining, for each received electronic calendar event for the first user, whether a shared meeting object corresponding to the electronic calendar event exists in a shared meeting object store managed by the shared calendar service; in response to determining that no shared meeting object corresponding to a first electronic calendar event exists in the shared meeting object store: creating a first shared meeting object in the shared meeting object store for the first electronic calendar event; determining meeting participants for the first electronic calendar event, wherein the determined meeting participants include the first user and at least one other user; and providing access to the first shared meeting object to each determined meeting participant, wherein providing access to the first shared meeting object includes enabling each meeting participant to add shared content to the first shared meeting object and view shared content added by other meeting participants; and in response to determining that a second shared meeting object corresponding to a second electronic calendar event exists in the shared meeting object store, updating the second shared meeting object based on the second electronic calendar event.

The foregoing and other described implementations can each, optionally, include one or more of the following features:

A first feature, combinable with any of the following features, wherein updating the second shared meeting object based on the second electronic calendar event comprises: identifying stored calendar event information for the second shared meeting object; comparing the stored calendar event information to the second electronic calendar event; and updating the second shared meeting object, based on a determined difference between the stored calendar event information and the second electronic calendar event.

A second feature, combinable with any of the following features, wherein the determined difference corresponds to a change in meeting participants.

A third feature, combinable with any of the following features, wherein the determined difference corresponds to a change in a meeting title.

A fourth feature, combinable with any of the following features, wherein the determined difference corresponds to a change in meeting time.

A fifth feature, combinable with any of the following features, wherein the determined difference indicates that a meeting has been cancelled.

A sixth feature, combinable with any of the following features, wherein the second shared meeting object was previously added to the shared meeting object store based on the shared calendar service receiving electronic calendar event information for a second user, wherein the second user is different from the first user.

A seventh feature, combinable with any of the following features, wherein the connection is established in response to execution for the first user of a shared calendar application.

An eighth feature, combinable with any of the following features, further comprising determining one or more meetings in which the first user is a participant and presenting, in the shared calendar application, for each determined meeting, meeting information from a corresponding shared meeting object, wherein the meeting information includes shared content for the shared meeting object.

A ninth feature, combinable with any of the following features, further comprising: receiving, from the first user, new shared content for a first meeting; and storing the new shared content in association with the first shared meeting object.

A tenth feature, combinable with any of the following features, wherein the new shared content comprises one of a new topic, a new note, a new link, a new comment, a new file, or a new media item.

An eleventh feature, combinable with any of the following features, wherein the new shared content is retrieved from an external system, where content or object can be mapped onto a shared meeting object, or relationship.

A twelfth feature, combinable with any of the following features, further comprising: determining one or more relationships for the first user, wherein each relationship is based on the first user participating in at least one meeting with another user; and presenting relationship information for the determined relationships in the shared calendar application.

A thirteenth feature, combinable with any of the following features, further comprising: receiving event information indicating a change in a meeting series; identifying multiple meeting store objects corresponding to the meeting series; and updating each of the multiple meeting store objects based on the indicated change in the meeting series.

A fourteenth feature, combinable with any of the following features, wherein the second shared meeting object is updated based on determining that the second electronic calendar event includes changes to a leading calendar.

A fifteenth feature, combinable with any of the following features, wherein the leading calendar is a calendar of a creator of a meeting corresponding to the second electronic calendar event.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   receiving, at a shared calendar service, permission from a first user to access electronic calendar information for the first user from a user calendar service;
   establishing, by the shared calendar service, a connection to the user calendar service;
   receiving, using the connection, at least two user electronic calendar events for the first user, from the user calendar service;
   determining, for each received user electronic calendar event for the first user, whether a shared meeting object corresponding to the user electronic calendar event exists in a shared meeting object store managed by the shared calendar service, including determining that no shared meeting object corresponding to a first user electronic calendar event of the at least two user electronic calendar events exists in the shared meeting object store and that a second shared meeting object corresponding to a second user electronic calendar event of the at least two user electronic calendar events exists in the shared meeting object store, wherein the determining that a second shared meeting object corresponding to a second user electronic calendar event exists in the shared meeting object store comprises:
      identifying an event identifier in the second user electronic calendar event;
      determining that the event identifier is not stored in the shared meeting object store;
      in response to determining that the event identifier is not stored in the shared meeting object store, comparing event information in the second user electronic calendar event to meeting information of each respective shared meeting object in the shared meeting object store to determine a likelihood for each shared meeting object that the second user electronic calendar event matches the shared meeting object; and
      determining that a likelihood that the second shared meeting object matches the second user electronic calendar event is more than a predetermined threshold;
   in response to determining that no shared meeting object corresponding to the first user electronic calendar event exists in the shared meeting object store:
   creating a first shared meeting object in the shared meeting object store for the first user electronic calendar event, wherein the shared meeting object is editable by multiple meeting participants of the first user electronic calendar event;
      determining, as determined meeting participants, meeting participants for the first user electronic calendar event, wherein the determined meeting participants include the first user and at least one other user; and
      providing access to the first shared meeting object to each determined meeting participant, wherein providing access to the first shared meeting object includes enabling authorized meeting participants to 1) add shared collaborative content to the first shared meeting object that is editable by at least one meeting participant other than the first user, 2) view shared collaborative content added by other meeting participants, 3) edit shared collaborative content added by other meeting participants, and 4) edit details for the first user electronic calendar event; and
   in response to determining that the second shared meeting object corresponding to the second user electronic calendar event exists in the shared meeting object store, updating the second shared meeting object based on the second user electronic calendar event.

2. The computer-implemented method of claim 1, wherein updating the second shared meeting object based on the second user electronic calendar event comprises:
   identifying stored calendar event information for the second shared meeting object;
   comparing the stored calendar event information to the second user electronic calendar event; and
   updating the second shared meeting object, based on a determined difference between the stored calendar event information and the second user electronic calendar event.

3. The computer-implemented method of claim 2, wherein the determined difference corresponds to a change in meeting participants.

4. The computer-implemented method of claim 2, wherein the determined difference corresponds to a change in a meeting title.

5. The computer-implemented method of claim 2, wherein the determined difference corresponds to a change in meeting time.

6. The computer-implemented method of claim 2, wherein the determined difference indicates that a meeting has been cancelled.

7. The computer-implemented method of claim 1, wherein the second shared meeting object was previously added to the shared meeting object store based on the shared calendar service receiving electronic calendar event information for a second user, wherein the second user is different from the first user.

8. The computer-implemented method of claim 1, wherein the connection is established in response to execution for the first user of a shared calendar application.

9. The computer-implemented method of claim 8, further comprising determining one or more meetings in which the first user is a participant and presenting, in the shared calendar application, for each determined meeting, meeting information from a corresponding shared meeting object, wherein the meeting information includes shared content for the shared meeting object.

10. The computer-implemented method of claim 9, further comprising:
   receiving, from the first user, new shared content for a first meeting; and
   storing the new shared content in association with the first shared meeting object.

11. The computer-implemented method of claim 10, wherein the new shared content comprises one of a new topic, a new note, a new link, a new comment, a new file, or a new media item.

12. The computer-implemented method of claim 1, further comprising:
   receiving new shared content from an external system;
   determining that the new shared content is associated with the first shared meeting object, a meeting participant, or a relationship between meeting participants; and
   storing the new shared content received from the external system at the shared calendar service in response to determining that the new shared content received from the external system is associated with the first shared meeting object, the meeting participant, or the relationship between the meeting participants.

13. The computer-implemented method of claim 8, further comprising:
   determining, as determined relationships, one or more relationships for the first user, wherein each relationship is based on the first user participating in at least one meeting with another user; and
   presenting relationship information for the determined relationships in the shared calendar application.

14. The computer-implemented method of claim 1, further comprising:
   receiving event information indicating, as an indicated change, a change in a meeting series;
   identifying multiple meeting store objects corresponding to the meeting series; and
   updating each of the multiple meeting store objects based on the indicated change in the meeting series.

15. The computer-implemented method of claim 1, wherein the second shared meeting object is updated based on determining that the second user electronic calendar event includes changes to a leading calendar.

16. The computer-implemented method of claim 15, wherein the leading calendar is a calendar of a creator of a meeting corresponding to the second user electronic calendar event.

17. A non-transitory, computer-readable medium storing one or more instructions executable by a computer system to perform operations comprising:
   receiving, at a shared calendar service, permission from a first user to access electronic calendar information for the first user from a user calendar service;
   establishing, by the shared calendar service, a connection to the user calendar service;
   receiving, using the connection, at least two user electronic calendar events for the first user, from the user calendar service;
   determining, for each received user electronic calendar event for the first user, whether a shared meeting object corresponding to the user electronic calendar event exists in a shared meeting object store managed by the shared calendar service, including determining that no shared meeting object corresponding to a first user electronic calendar event of the at least two user electronic calendar events exists in the shared meeting object store and that a second shared meeting object corresponding to a second user electronic calendar event of the at least two user electronic calendar events exists in the shared meeting object store, wherein the determining that a second shared meeting object corresponding to a second user electronic calendar event exists in the shared meeting object store comprises:
      identifying an event identifier in the second user electronic calendar event;
      determining that the event identifier is not stored in the shared meeting object store;
      in response to determining that the event identifier is not stored in the shared meeting object store, comparing event information in the second user electronic calendar event to meeting information of each respective shared meeting object in the shared meeting object store to determine a likelihood for each shared meeting object that the second user electronic calendar event matches the shared meeting object; and
      determining that a likelihood that the second shared meeting object matches the second user electronic calendar event is more than a predetermined threshold;
   in response to determining that no shared meeting object corresponding to the first user electronic calendar event exists in the shared meeting object store:
      creating a first shared meeting object in the shared meeting object store for the first user electronic calendar event, wherein the shared meeting object is editable by multiple meeting participants of the first user electronic calendar event;
      determining, as determined meeting participants, meeting participants for the first user electronic calendar event, wherein the determined meeting participants include the first user and at least one other user; and
      providing access to the first shared meeting object to each determined meeting participant, wherein providing access to the first shared meeting object includes enabling authorized meeting participants to 1) add shared collaborative content to the first shared meeting object that is editable by at least one meeting participant other than the first user, 2) view shared collaborative content added by other meeting participants, 3) edit shared collaborative content added by other meeting participants, and 4) edit details for the first user electronic calendar event; and
   in response to determining that the second shared meeting object corresponding to the second user electronic calendar event exists in the shared meeting object store, updating the second shared meeting object based on the second user electronic calendar event.

18. The non-transitory, computer-readable medium of claim 17, wherein updating the second shared meeting object based on the second user electronic calendar event comprises:
- identifying stored calendar event information for the second shared meeting object;
- comparing the stored calendar event information to the second user electronic calendar event; and
- updating the second shared meeting object, based on a determined difference between the stored calendar event information and the second user electronic calendar event.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
- receiving, at a shared calendar service, permission from a first user to access electronic calendar information for the first user from a user calendar service;
- establishing, by the shared calendar service, a connection to the user calendar service;
- receiving, using the connection, at least two user electronic calendar events for the first user, from the user calendar service;
- determining, for each received user electronic calendar event for the first user, whether a shared meeting object corresponding to the user electronic calendar event exists in a shared meeting object store managed by the shared calendar service, including determining that no shared meeting object corresponding to a first user electronic calendar event of the at least two user electronic calendar events exists in the shared meeting object store and that a second shared meeting object corresponding to a second user electronic calendar event of the at least two user electronic calendar events exists in the shared meeting object store, wherein the determining that a second shared meeting object corresponding to a second user electronic calendar event exists in the shared meeting object store comprises:
  - identifying an event identifier in the second user electronic calendar event;
  - determining that the event identifier is not stored in the shared meeting object store;
  - in response to determining that the event identifier is not stored in the shared meeting object store, comparing event information in the second user electronic calendar event to meeting information of each respective shared meeting object in the shared meeting object store to determine a likelihood for each shared meeting object that the second user electronic calendar event matches the shared meeting object; and
  - determining that a likelihood that the second shared meeting object matches the second user electronic calendar event is more than a predetermined threshold;
- in response to determining that no shared meeting object corresponding to the first user electronic calendar event exists in the shared meeting object store:
  - creating a first shared meeting object in the shared meeting object store for the first user electronic calendar event, wherein the shared meeting object is editable by multiple meeting participants of the first user electronic calendar event;
  - determining, as determined meeting participants, meeting participants for the first user electronic calendar event, wherein the determined meeting participants include the first user and at least one other user; and
  - providing access to the first shared meeting object to each determined meeting participant, wherein providing access to the first shared meeting object includes enabling authorized meeting participants to 1) add shared collaborative content to the first shared meeting object that is editable by at least one meeting participant other than the first user, 2) view shared collaborative content added by other meeting participants, 3) edit shared collaborative content added by other meeting participants, and 4) edit details for the first user electronic calendar event; and
- in response to determining that the second shared meeting object corresponding to the second user electronic calendar event exists in the shared meeting object store, updating the second shared meeting object based on the second user electronic calendar event.

20. The computer-implemented system of claim 19, wherein updating the second shared meeting object based on the second user electronic calendar event comprises:
- identifying stored calendar event information for the second shared meeting object;
- comparing the stored calendar event information to the second user electronic calendar event; and
- updating the second shared meeting object, based on a determined difference between the stored calendar event information and the second user electronic calendar event.

* * * * *